United States Patent
Muraki et al.

(10) Patent No.: US 6,904,403 B1
(45) Date of Patent: Jun. 7, 2005

(54) AUDIO TRANSMITTING APPARATUS AND AUDIO RECEIVING APPARATUS

(75) Inventors: Kenji Muraki, Osaka (JP); Keiko Tanaka, Osaka (JP); Naoki Ejima, Osaka (JP); Yasushi Nakajima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 646 days.

(21) Appl. No.: 09/667,666

(22) Filed: Sep. 22, 2000

(30) Foreign Application Priority Data

Sep. 22, 1999 (JP) .......................................... 11-268618
Mar. 7, 2000 (JP) ...................................... 2000-061479

(51) Int. Cl.[7] ............................................ G10L 19/00
(52) U.S. Cl. ...................................... 704/212; 704/500
(58) Field of Search .......................... 704/212, 500–504

(56) References Cited

U.S. PATENT DOCUMENTS 6,076,062 A * 6/2000 Van Steenbrugge ......... 704/500
6,092,230 A * 7/2000 Wood et al. ................. 714/755
6,181,870 B1 * 1/2001 Okada et al. .................. 386/95
6,356,754 B1 * 3/2002 Onozawa et al. ........ 455/412.1
6,490,728 B1 * 12/2002 Kitazato et al. ............ 725/151
6,510,409 B1 * 1/2003 Su ............................. 704/233
6,512,919 B2 * 1/2003 Ogasawara .............. 455/422.1
6,574,419 B1 * 6/2003 Nonomura et al. ........... 386/95
6,578,162 B1 * 6/2003 Yung .......................... 714/708

OTHER PUBLICATIONS

1394 Trade Association, "Audio and Music Data Transmission Protocol", Version 1.0, May 1997 pp. 1–23.

* cited by examiner

Primary Examiner—David L. Ometz
Assistant Examiner—Michael N. Opsasnick
(74) Attorney, Agent, or Firm—RatnerPrestia

(57) ABSTRACT

In transmission of digital audio data usingIEEE1394, for example, when the audio data is changed from linear PCM to nonlinear PCM, identifier adding means of the transmitting apparatus inserts a silent identifier and nearly zero data for a specific time, and first identifier distinguishing means of the receiving apparatus changes over the output of data processing selecting means from linear PCM processing side to nonlinear processing side when detecting the silent identifier, thereby preventing generation of noise when changing over the data.

20 Claims, 18 Drawing Sheets

FIG. 7

| Transmission side output | Linear PCM | Silent identifier | Nonlinear PCM | |
|---|---|---|---|---|
| Reception side identifier detection | Linear PCM | Silent identifier | Nonlinear PCM | |
| Reception side output | Linear PCM | Nearly zero data | Mute | Nonlinear PCM |

FIG. 8

| Transmission side output | Linear PCM | Silent identifier | Nonlinear PCM |
|---|---|---|---|
| Reception side identifier detection | Linear PCM | Silent identifier | Nonlinear PCM |
| Reception side output | Linear PCM | Zero data | Mute | Nonlinear PCM |

AUDIO TRANSMITTING APPARATUS AND AUDIO RECEIVING APPARATUS

FIELD OF THE INVENTION

The present invention relates to an audio transmitting apparatus and an audio receiving apparatus for transmitting digital data by a specified transmission route, for example, the IEEE1394.

BACKGROUND OF THE INVENTION

Recently it is general to transmit digital signals between digital electronic appliances. As the standard for transmission of digital audio data, the IEC60958 is known. Lately, as the serial transmission standard suited to multimedia application, the IEEE1394 is established.

The IEEE1394 system can be used not only in place of computer data transmission by the conventional SCSI (small computer system interface) system, but also m transmission of AV data such as audio and video. This is because both communication methods of asynchronous communication and isochronous communication are defined in this IEEE1394 system.

Isochronous communication is a data transmission method used in transmion of data where real-time operation is demanded such as AV data. In isochronous communication, prior to start of transmission, a band necessary for transmission of data is acquired. The data is transmitted by using this band. As a result, the real-time operation of data transmission is guaranteed On the other hand, asynchronous communication is a transmission method used in transmission of data or control of devices where real-time operation is not demanded such as transmission of computer data.

Further, a protocol of transmission of digital audio data and MIDI (musical instrument digital interface) on the IEEE1394 bus is standardized as A/M protocol (audio and music data transmission protocol) by the 1394 Trade Association. In this standard, a standard for transmitting audio data of IEC60958 format is specified. This A/M protocol makes use of CIP (common isochronous packet) defined in the IEC61883.

FIG. 3 shows the composition of CIP. The CIP is composed of a packet header, a data field, and a data CRC. The data field is further divided into a CIP header and a data block. Data to be transmitted is inserted in the data block, and in particular the composition of 8-bit label and 24-bit data is called AM824 data. The IEC60958 format data is classified as a kind of AM824 data FIG. 4 shows the composition and label content of AM824 data. The content of label in A/M protocol Ver. 1 is IEC60958, raw audio, and MIDI. The raw audio is analog audio data to be digitized directly, and it is the raw data not containing accessory information FIG. 5 shows the composition of AM824 data in IEC60958 format. In the case of IEC60958 format, 24-bit data is one sub-frame. One frame, which is the minimum unit of audio data, is composed of two sub-frames in the case of two-channel stereo. When two higher bits of the label are both 0, that is, when the value of the label is in a range of 00h to 3Fh, it means the IEC60958 format, and the composition of its six lower bits is as shown in FIG. 5.

As the transmission protocol on the IEEE1394, other methods have been also proposed. One of them is the AV protocol. The AV protocol is standardized as IEC (International Electromechanical Commission) 61883, and a method of transmitting and receiving real-time AV data by isochronous communication, and a method of transmitting and receiving device commands by asynchronous communication are specified.

In the case of data transmission and reception by isochronous communication, the transmitting and receiving systems are determined for each data format such as video data and audio data. For example, for transmission and reception of audio data of CD or the like, the method of transmission is designated in the AM protocol (audio and music data transmission protocol) Ver. 1.0 established at 1394 Trade Association (1394TA). In the AM protocol, mainly two-channel audio data transmission is assumed, but recently appliances handling audio data of three channels or more are being developed. Expansion of the standard has been discussed in order to cope with such appliances. An expansion plan is disclosed as Enhancement to Audio and Music Data Transmission Protocol Working Draft Version 0.1, Apr. 7, 1999, of 1394TA.

First, as an introductory knowledge, the audio data transmitting and receiving method mentioned in the AM protocol expansion plan is explained below in the sequence of packet transmission timing on the bus, transmission of clock information, and packet composition.

FIG. 14 is a diagram showing the packet transmission timing on the IEEE1394 bus. In FIG. 14, CS is a cycle start packet, ISO is an isochronous packet used in isochronous communication, and Asy is an asynchronous packet used in asynchronous communication. In the IEEE1394, of the nodes connected to the bus, the cycle master node issues a cycle start packet in every isochronous cycle (125 $\mu$s). Following the cycle start packet, the node for transmitting the isochronous packet starts a transmission arbitrate operation, and transmits the isochronous packet after acquiring the bus. After each isochronous packet transmission, when a blank time called isochronous gap passes, other node starts a transmission arbitrate operation f isochronous packet transmission, and the packet is transmitted. When all isochronous packets have been transmitted, following a blank time called sub-action gap, the node attempting to transmit an asynchronous packet starts an asynchronous transmission arbitrate operation, and transmits an asynchronous packet after acquiring the bus. Since the sub-action gap is set longer than the isochronous gap, the isochronous packet is processed by priority. Hence, a specific transmission rate is assured.

Clock information transmission of data is explained.

FIG. 15 is a diagram showing clock information transmission between a transmission node and a reception node. In FIG. 15, a cycle master node 1201 issues a cycle start packet containing a reference count. A transmission node 1202 and a reception node 1203 are connected with an IEEE1394 bus 1204. In the IEEE1394 bus, as mentioned above, various packets are transmitted in timesharing, but in FIG. 15, for the convenience of explanation, two kinds of data lines are used for reference count and isochronous packet.

The IEEE1394 bus is designed to connect nodes one by one, and does not branch into a T. In actual connection, therefore, for example, the cycle master node 1201 and transmission node 1202 are connected by one cable, and the transmission node 1202 and reception node 1203 are connected by other cable. Conceptually, herein, in order to show that three nodes have a common reference count, the connection is shown in a T-form.

The cycle master node 1201 has reference clock generating means 1205 and counter 1206. Similarly, the transmission node 1202 has reference clock generating means 1207 and counter 1208, and the reception node 1203 has reference clock generating means 1211 and counter 1212. The reference clock generating means 1205, 1027, and 1211 are independent of each other. Counting of the counters 1206, 1208, and 1212 is corrected by the reference count included in the cycle start packet issued by the cycle master node 1201. Therefore, the count value of each node has an error of only less than the reference clock resolution of each node.

The transmission nodes 1202 further includes time stamp generating means 1209 which generates a time stamp by receiving an audio clock (for example, 44.1 kHz in the case of a CD) and counting from the counter 1208, and packeting means 1210 which makes an isochronous packet by receiving audio data (16-bit stereo PCM data in the case of a CD) and the time stamp.

The reception node 1203 further includes unpacketing means 1213 which receives an isochronous packet and takes out audio data and time stamp, a comparator for comparing the counting of the counter 1212 and the time stamp, and issuing a pulse when the both are matched, and a PLL 1215 which regenerates an audio clock on the basis of the pulse.

In this explanation, transmission of audio data only is described, but as mentioned below, in the AM protocol the data accessory information can be transmitted simultaneously with the data.

The composition of an isochronous packet in the AM protocol is explained. FIG. 16 shows an example of an isochronous packet in the AM protocol. The isochronous packet used in data transmission in the AM protocol includes two headers, that is, the isochronous packet header defined in the IEEE1394 and a common isochronous packet header (CIP header) defined in the AV protocol. These two headers are followed by plural data blocks, and finally there is a function of CRC (cyclic redundancy check) for the CIP header and data blocks. This is the audio signal of IEC60958 format formed into a packet according to the AM protocol. The IEC60958 format is described later. In the IEEE1394, four-byte data is handled as one unit, which is called quadlet. One line in FIG. 16 is one quadlet.

The isochronous packet header is explained in the first place.

The isochronous packet header is composed of a header main body of one quadlet, and a header CRC of one quadlet. Each field of the isochronous packet header is described. The data length refers to the byte length of the data field (CIP header and data block) following the isochronous packet header. Tg (isochronous data format tag) shows the label of the data transmitted in isochronous packet. If having the CIP header, the value of Tg is 01b (b denotes binary notation). The channel gives the channel number of logic channel from 0 to 63 of flow of isochronous packet data. tCode (transaction code) shows the packet format and transaction type. tCode of isochronous packet is Ah (h denotes hexadecimal notation). Incidentally, sy (synchronous code) is used when exchanging synchronous information between the sender side and the receiver side.

The CIP header is explained.

The CIP header used in the AM protocol is two quadlets long. First two bits of the first quadlet are 00b, and first two bits of the second quadlet are 10b.

Each field is described. SID (source ID) is a node ID of a device for sending out data. DBS (data block size) shows the size of data block following the CIP header in the quadlet unit. FN (fraction number) indicates the number of fractions when the original data to be transmitted by the IEEE1394 (DV system data by intra-frame compression of digital VTR, MPEG-TS data, etc.) is divided and data blocks are composed. FN shows four types of fractions, that is, no fraction, 2, 4, and 8 fractions. In the AM protocol, it is no fraction (00b). QPC (quadlet padding count) shows the number of quadlets of zero data added as dummy to the original data in order to express the size of the CIP in the quadlet unit when making the CIP by dividing the original data. It is 000b in the AM protocol. The bit "S" next to the QPC shows the SPH (source packet header), which indicates presence or absence of source packet data. There is no source packet header (0b) in the AM protocol. RSV is reserve, of which value is 00b. DBC (data block count) shows the count of beginning data blocks in the packet, which is used for detecting missing of packet. FMT (format) shows the major classification of signals being transmitted. It is 10h in the AM protocol. FDF (format dependent field) is defined in each FMT. In the AM protocol, the FDF of 00h to 07h is called AM824. In the AM824, each quadlet for composing the data block is divided into an 8-bit label and 24-bit data. In SYT, time stamp information is stored. The time stamp is described later.

The composition of data block is described.

In FIG. 16, two quadlets following the CIP header compose one data block The CIP contains n data blocks. The value of n varies with the attribute to the data to be transmitted. A specific example thereof is explained below.

The IEC60958 format data widely used in digital audio is defined as a kind of AM824 data. In the IEC60958, it is possible to transmit linear PCM data of 2 ch, 48 kHz sampling, and up to 24 bits, or compressed audio stream of AC3 (a kind of multi-channel audio compression), dts (digital theater system), and MPEG. In the IEC60958 format, 24-bit audio data (if less than 24 bits, the LSB (least significant bit) side is filled with 0 to make up 24-bit data) is called one sub-frame. Two sub-frames showing two-channel stereo make one frame, and 192 frames are gathered to make up one block.

FIG. 5 shows the composition of AM824 data in the IEC60958 format. The label value of the IEC60958 format is 00h to 3Fh. The composition of six lower bits of the label is as shown in FIG. 5.

In FIG. 5, PAC (preamble code) distinguishes among three, that is, "beginning of block in channel 1, "not beginning block in channel 1", and "other than channel 1." P (parity) is prepared for detecting errors due to interface fault. C (channel status) expresses the information of audio data length, sampling frequency, linear PCM or not, category, etc., summing up data of 192 bits for one block. That is, to obtain these items of information, it requires data for 192 frames. In one CIP, however, only data for several frames can be stored, and tens of packets are needed for acquiring 192 frames. The content of U (user bit) is defined in each category. V (validity flag) shows whether the data of the sub-frame is valid linear PCM or not. If the validity flag is 0, its sub-frame is a valid linear PCM. In the case of 1, it is not valid linear PCM, but compressed audio data may be included in this case.

In the AM protocol two packet composing methods are specified, that is, the blocking method and non-blocking method. In the blocking method, when a specified amount of data is collected in the transmission node, the collected data is transmitted as one packet. In the non-blocking method, on the other hand, the data occurring or reaching in the transmission node in one isochronous cycle (125 μs) is transmitted as one packet. An example of non-blocking method is described below.

FIG. 17 is a diagram showing transmission and reception timing of audio data.

In the non-blocking method, audio data arriving at the packeting means 1201 in one isochronous cycle (125 μs) is gathered in one isochronous packet.

In the isochronous packet, the SYT field of the CIP header is provided with a time stamp, but since a plurality of audio data are gathered in one packet, individual audio data are not provided with time stamps. In the AM protocol, a parameter SYT_INTERVAL corresponding to the sampling frequency of data is determined. A time stamp is generated for every SYT_INTERVAL. In the case of sampling frequency of 44.1 kHz, SYT_INTERVAL is 8. The time stamp generating means 1209 divides the audio clock (44.1 kHz in the case of a CD) by SYT_INERVAL (8 divisions in CD), and samples the value of the counter 1208 by the edge of the frequency dividing signal (T1, T2, . . . in FIG. 17). A transmission delay time (usually 352 μs) is added to the sampled value, and a time stamp (R1, R2, . . . ) is obtained. That is, the time stamp designates the time of regenerating the audio data at the reception node 1203 side.

Since the generation timing of time stamp is asynchronous to the isochronous cycle, the index given in formula 1 from the DBC (data block count) of the CIP header shows the time stamp corresponds to which data in the packet.

$$\text{index}=\text{mod}((\text{SYT\_INTERVAL}-\text{mod}(\text{DBC, SYT\_INERVAL})),\ \text{SYT\_INTERVAL}) \quad \text{[Formula 1]}$$

Thus, in the packeting means 1210, data (in the case of sampling frequency of 44.1 kHz, usually five or six pieces of data are stored in one packet) and time stamp are gathered, and one isochronous packet is formed.

This is the introductory knowledge for transmission of isochronous data on the IEEE1394.

Going back, the audio data of the IEC60958 format is linear PCM data or nonlinear PCM data such as compressed audio data. To reproduce such data, identifier A or identifier B attached to the audio data is distinguished, and the data is processed by selecting a processing method corresponding to the linear PCM (identifier A) or nonlinear PCM (identifier B). The identifier is assigned in the channel status data, and the channel status data is composed of channel status bits of 192 frames. That is, to distinguish the type of audio data, data of 192 frames is needed. In one CIP, however, only several frames can be added, and therefore tens of packets are needed for acquiring 192 frames. In other words, to distinguish the type of the audio data, a time delay of 192 frames occurs.

Accordingly, when the transmitted digital audio data is changed from the linear PCM data into nonlinear PCM data, noise occurs while the identifier decision is delayed. To prevent this, if the data is accumulated until the identifier is judged, a memory of a large capacity is needed, and delay occurs for the duration of accumulation.

FIG. 6 is a timing chart when the digital audio data changes from the linear PCM data to the nonlinear PCM data. As shown in FIG. 6, noise occurs for the duration of 192 frames until the reception side distinguishes the identifier after transition.

SUMMARY OF THE INVENTION

The invention is intended to solve the problems of the prior art, and it is hence an object thereof to present an audio transmitting apparatus and an audio receiving apparatus capable of preventing noise without requiring memory depending on the type change of the audio data to be transmitted.

To achieve the object, the audio transmitting apparatus and audio receiving apparatus of the invention comprise at least data transmitting means for sending out digital audio data, and identification information showing the type of the digital audio data, identification information distinguishing means for distinguishing the identification information of the data sent out in a specified transmission route, and data processing selecting means for selecting the processing method of digital audio data depending on the result of the indentation information distinguishing means.

To achieve the object, the audio transmitting apparatus of the invention in other aspect comprises at least data transmitting means for sending out digital audio data and identification information showing the type of the digital audio data in a transmission route, in which the data transmitting means issues information showing silent identification information C and identification information A for a specified time T1 of transition from digital audio data of identification information A to digital audio data of identification information B, and further issues information showing silent identification information C and identification information B for a specified time T2.

The audio receiving apparatus of the invention in a different aspect comprises identification information distinguishing means for distinguishing the identifier of the data received through a transmission route, in which digital audio data is issued direly in the case of identification information showing non-encode mode, depending on the output of the identification information distinguishing means, or issued by way of data decoding means in the case of identification information showing encode mode, the output is immediately muted nearly to zero in the case of identification information showing the identification information before the silent identification information C is non-encode mode in the case of silent identification information C, the output is immediately muted nearly to zero after termination of processing of the data in process by data decoding means in the case of identification information showing the identification information before the silent identification information C is encode mode, thereby changing to the setting for data output depending on the identification information accompanying the silent identification information C in the midst of muting by the silent identification information C.

In this constitution, if the format changes, the audio data can be transmitted and received securely.

BRIEF DESCRIPTION OF THE DRAWINGS

FIG. 7 is a diagram showing the timing when the digital audio data changes from linear PCM data to nonlinear PCM data in embodiment 1.

FIG. 8 is a diagram showing the timing when the digital audio data changes from linear PCM data to nonlinear PCM data in embodiment 2.

DETAILED DESCRIPTION OF THE EMBODIMENTS

Figure 1:
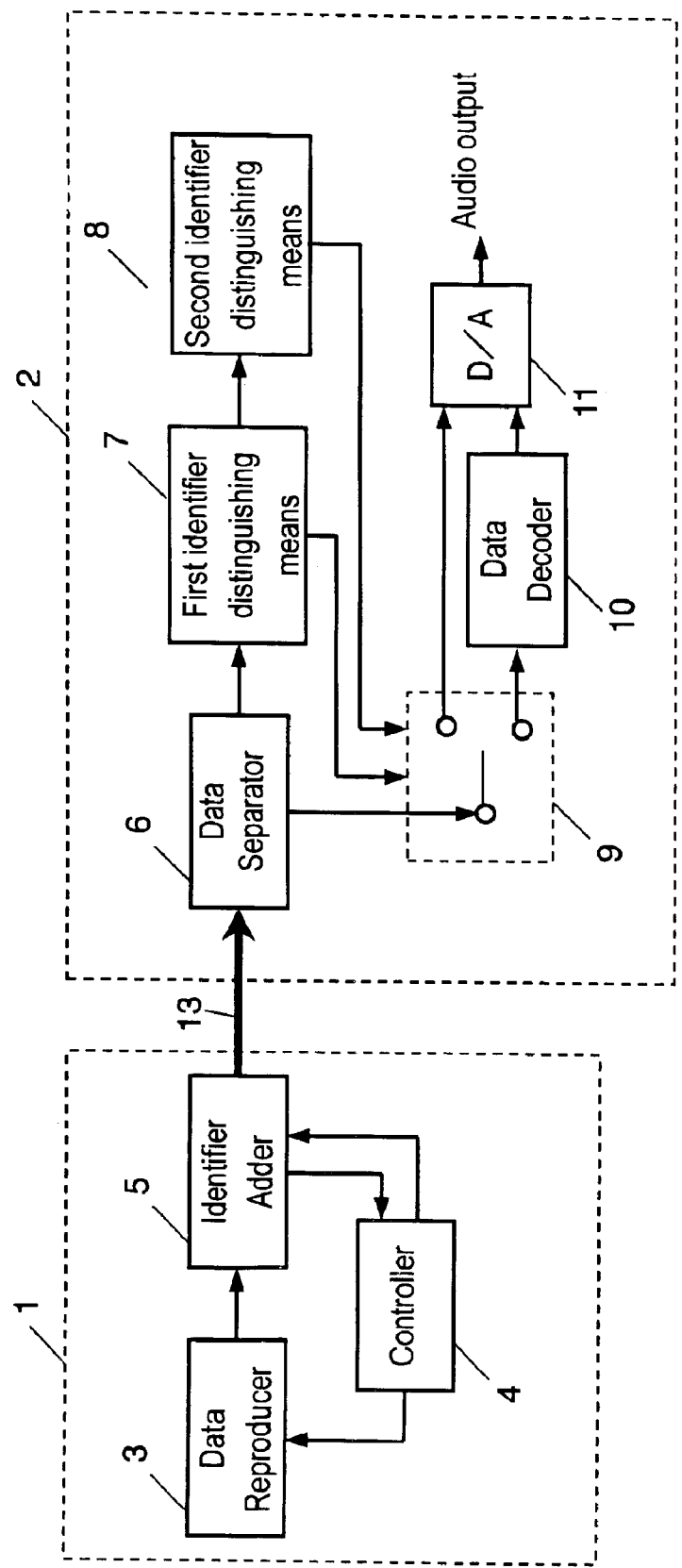
FIG. 1 is a block diagram showing a configuration of audio transmitting apparatus and audio receiving apparatus in embodiment 1 of the invention.

Referring now to the drawings, preferred embodiments of the invention are described in detail below.

In the explanation of the following embodiments, the identifier is used as the identification information.

(Embodiment 1)

FIG. 1 is a block diagram showing a configuration of audio transmitting apparatus and audio receiving apparatus in embodiment 1 of the invention.

FIG. 1 shows a DVD (digital versatile disc) player 1 for playing back a DVD and issuing at least a digital audio output to an IEEE1394 bus 13 as transmission route as an example of audio transmitting apparatus, and an amplifier 2 for reproducing digital audio data issued to the IEEE1394 bus 13 as an example of audio receiving apparatus.

In the DVD player 1, data reproducer 3 reproduces digital audio data and management information of digital audio data from the DVD. Controller 4 controls output of the data reproducer 3. Identifier adder 5 distinguishes the kind of the digital audio data from the management information of digital audio data. The adder 5 issues the distinguishing result to the controller 4 as the identifier (or identification information), and also converts the identifier into the label format, and adds the label to the digital audio data and issues to the IEEE1394 bus 13.

In the amplifier 2, data separator 6 separates the data issued to the IEEE1394 bus 13 into label and digital audio data. First identifier distinguishing means 7 distinguishes the content of the label for the portion of one sub-frame. Second identifier distinguishing means 8 accumulates channel status bits of 192 frames, and distinguishes whether the audio data is linear PCM or nonlinear PCM. Data processing selector 9 selects a processing method of digital audio data depending on the result of the first identifier judging means 7 or second identifier judging means 8. Data decoder 10 decodes nonlinear PCM data. A DA converter 11 (D/A) converts digital audio data into an analog signal.

Figure 15:
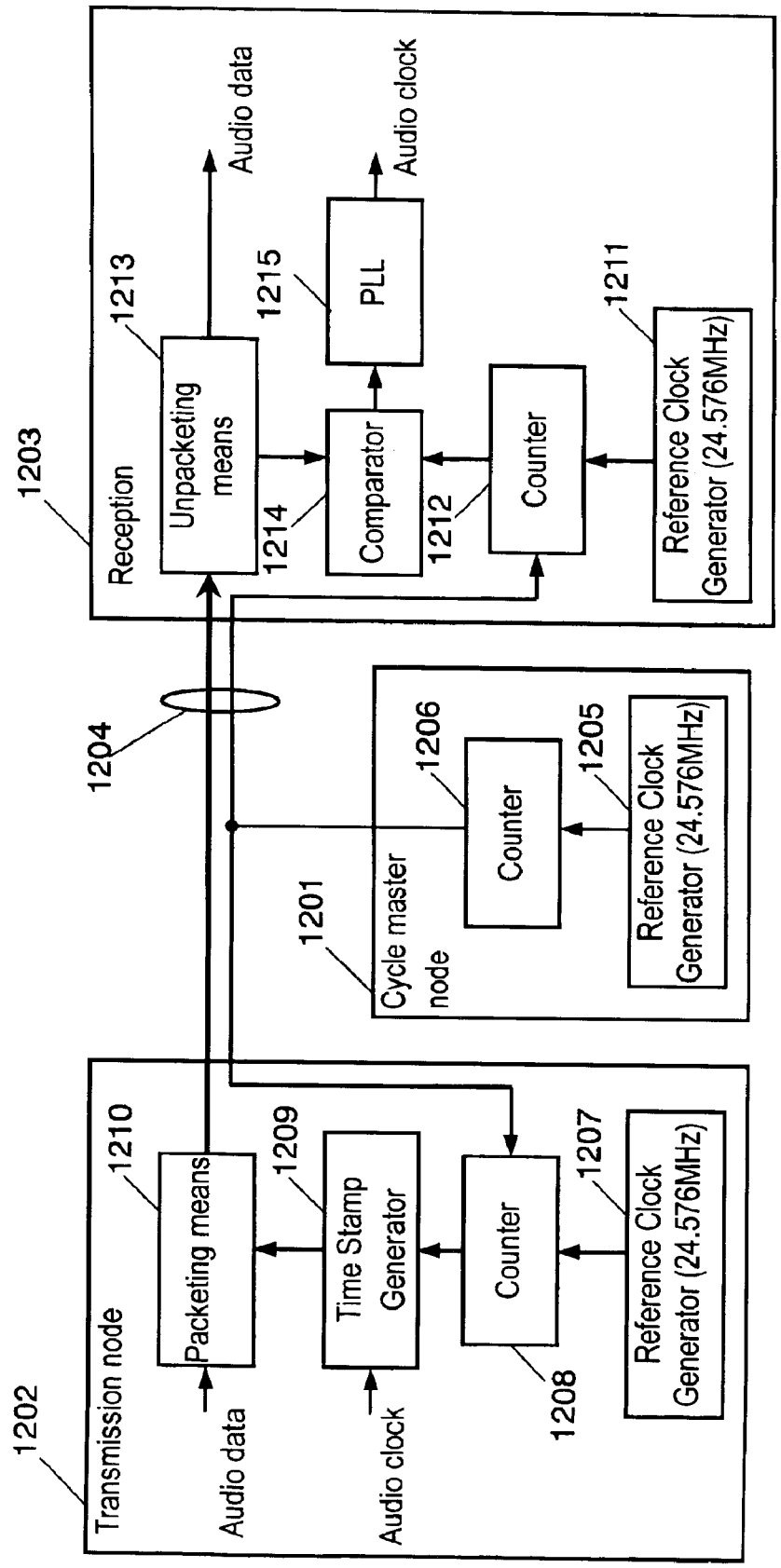
FIG. 15 is a diagram showing transmission of clock information between transmission node and reception node.

The controller 4 and identifier adder 5 in FIG. 1 are including in the packeting means 1210 in FIG. 15. The data separator 6, first identifier distinguishing means 7, and second identifier distinguishing means 8 are supposed to be included in the unpacketing means 1213 in FIG. 15. In FIG. 1, the structure relating to the clock in FIG. 15 is omitted.

In thus constituted audio transmitting apparatus and audio receiving apparatus, the audio data of DVD is transferred to the amplifier through the IEEE1394 bus 13 in the IEC60958 format, and the audio output is issued through the amplifier, and the audio transmission operation in this case is explained below.

First, the data reproducer 3 reproduces the DVD, and issues audio data to the identifier adder 5. At this time, the audio data is linear PCM data The identifier adder 5 generates the identifier of linear PCM data as identifier A from the management information of audio data issued from the data reproducer 3, and issues the identifier A to the controller 4, and also converts the identifier A into the label format, and adds the label to the audio data, and issues to the IEEE1394 bus 13.

Suppose the audio data of the DVD reproduced in the data reproducer 3 is changed from the linear PCM data to nonlinear PCM data. At this time, the controller 4 detects changes from the identifier issued from the identifier adder 5, and stops the audio output of the data reproducer 3. As the stopping means, several methods are considered, and in this case the DVD reproducing operation is stopped The identifier adder 5 continuously issues nearly zero data adding silent identifier C as shown in FIG. 7. After a specific time, for example, 30 msec later, the nearly zero data is stopped, and audio output is started from the beginning of the nonlinear PCM data. The specified time may range from 3 msec to hundreds of msec as required.

The silent identifier C is an identifier showing the type of audio data newly added in the embodiment, and it is assigned in a value presently in a vacant region (reserved) in the label or C1h in ancillary data region in this case. The assigned value may be a different value, for example, CF, depending on the standard change or other reason.

The silent identifier C has a specified data region, and the data region is clarified in the application, by filling the 16 bits of MSB side with "0" and assigning the remaining LSB side 8 bits with sub-label. When the MSB side 16 bits are "0", the level may be very small, being less than −96 dB. Hence, there is no practical problem if the changeover timing is delayed and the data is directly issued as linear PCM. To make silent by using the silent identifier C, there is other purpose aside from changeover of the type of audio data, and the label shows the data is silent, and the sub-label shows the purpose of making silent For example, in the case of making dummy channels for the purpose of alignment of the number of channels, such as a case of transmitting monaural signal in stereo two-channel transmission format, monaural data is put in one channel and silent data in other channel. Or in the case of simultaneous transmission of low rate application and high rate application, silent data is added to the low rate side so as to be matched with the high rate side. In such a case, the sub-level may be used in identification of the related application.

Thus, in the DVD player or the like, in the block of the audio transmitting apparatus for issuing data, when the audio data changes from linear PCM data to nonlinear PCM data, it is designed to issue to the IEEE1394 bus 13 by enclosing nearly zero data adding silent identifier C for a specified time.

On the other hand, at the amplifier side for receiving the data from the IEEE1394 bus 13, first, the data separator 6 separates the label and audio data. The label is issued to the first identifier distinguishing means 7, and the audio data is issued to the data processing selector 9. The first identifier distinguishing means 7 distinguishes the content of the label for the portion of one sub-frame, and issues the result to the data processing selector 9. At the same time, the distinguishing means 7 issues the content of the label to the second identifier distinguishing means 8 when the label is of IEC60958 format. The second identifier distinguishing means 8 extracts the channel status bits from the label accumulates for 192 frames, and compiles channel status data. Later, the distinguishing means 8 distinguishes the audio data whether the linear PCM data or nonlinear PCM data, and issues the result to the data processing selector 9. The data processing selector 9 sets the output of the audio data to the data decoder 10 when the result of the first identifier distinguishing means 7 is silent identifier C and the result of the second identifier distinguishing means 8 is nonlinear PCM data. At this time, when the result of the second identifier distinguishing means 8 is linear PCM data, the selector 9 sets the output of the audio data to the D/A 11.

In the audio receiving apparatus of the embodiment, to the input adding the silent identifier according to the invention, the first identifier distinguishing means changes over the signal type accordingly, and to the input from the audio transmitting apparatus not conforming to the invention, the second identifier distinguishing means changes over the signal type accordingly, so that the compatibility is assured if the transmitting apparatus side is a conventional one.

Supposing the audio data issued from the IEEE1394 bus 13 is changed from the linear PCM data to nearly zero data with silent identifier, the first identifier distinguishing means 7 detects a silent identifier from the label and issues the result to the data processing selector 9. At this time, the data processing selector 9 can judge it shows transition from linear PCM to nonlinear PCM.

FIG. 7 shows a timing chart of the digital audio data changing from linear PCM data into nonlinear PCM data in embodiment 1. As shown in FIG. 7, since the audio data with silent identifier is nearly zero data, large noise is not generated if the identifier is taken for linear PCM by mistake.

Thus, by detecting the nearly zero data with silent identifier, the changeover state including mode transition can be recognized, and the nonlinear PCM data can be initialized, and the mute processing can be done accurately until the decode output is obtained. The mute processing is instructed by the data decoder, and its time is usually about tens to hundreds of milliseconds. Besides, since the accessory data itself is nearly zero, if reproduced as PCM data by mistake, the noise generation can be suppressed to a minimum limit.

According to the embodiment, when the audio data is changed from the linear PCM data to nonlinear PCM data, the transmission side issues to the IEEE1394 bus 13 by enclosing the nearly zero data adding silent identifier for a specified time. The reception side sets the data processing selection to the nonlinear PCM side when detecting the silent identifier. Hence, it is possible to cope with change in the type of the transmitted digital audio data promptly.

(Embodiment 2)

Figure 2:
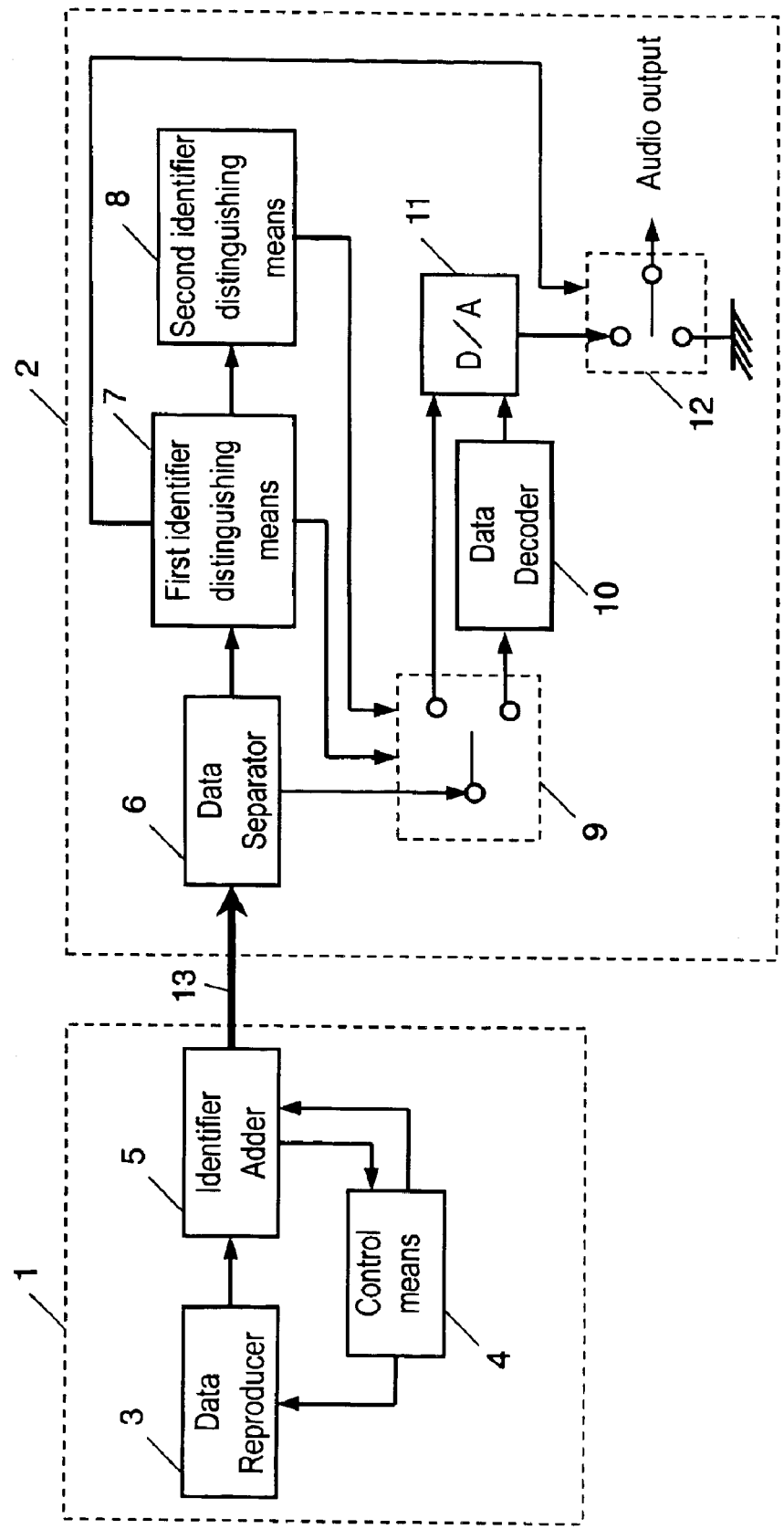
FIG. 2 is a block diagram showing a configuration of audio transmitting apparatus and audio receiving apparatus in embodiment 2 of the invention.
Figure 3:
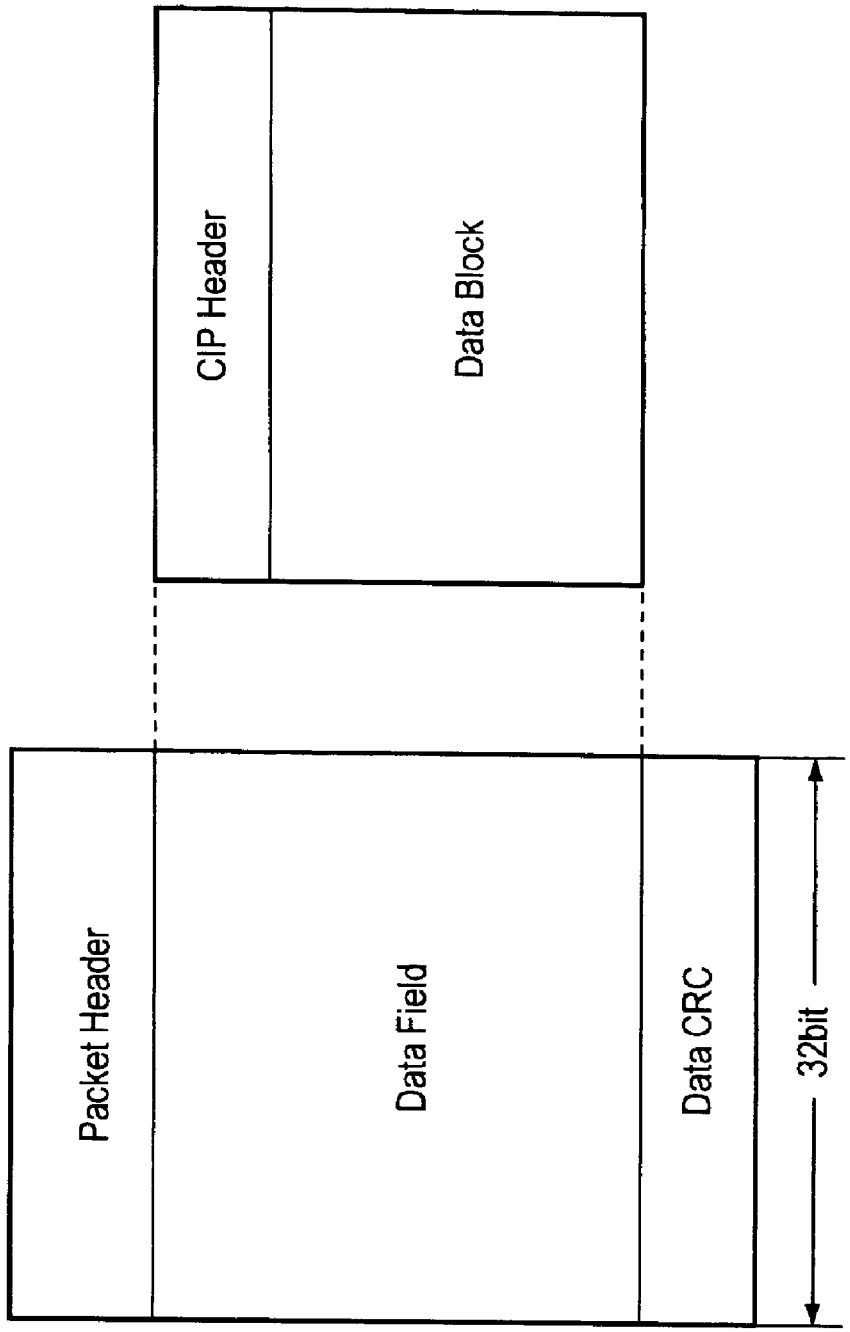
FIG. 3 is a diagram showing a configuration of CIP in IEEE1394.
Figure 4:
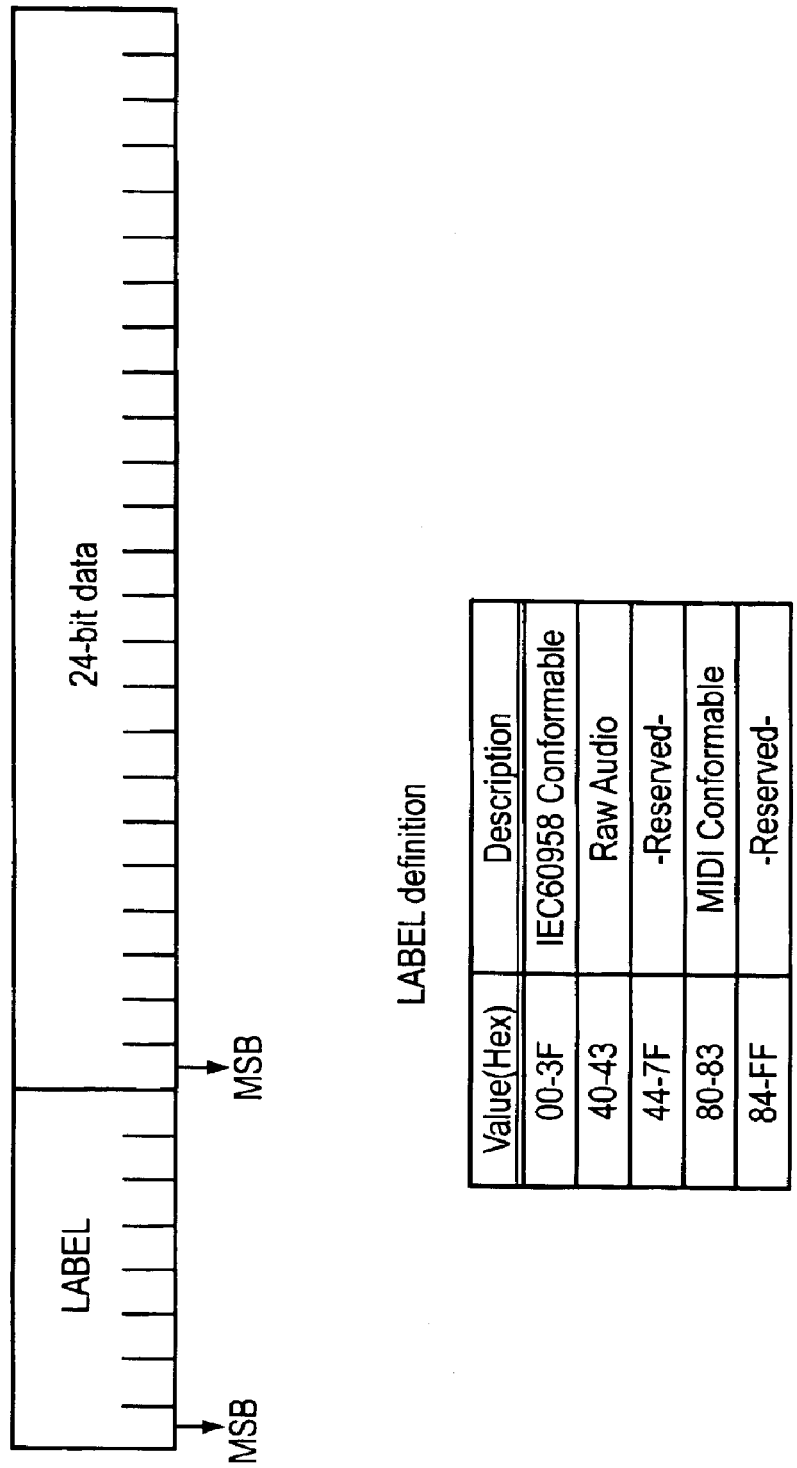
FIG. 4 is a diagram showing AM824 data composition and label content in A/M protocol.

FIG. 2 is a block diagram showing a configuration of audio transmitting apparatus and audio receiving apparatus in embodiment 2 of the invention. In FIG. 2, constituent elements indicated by reference numerals 1 to 11 are same as in FIG. 1. What differs from FIG. 1 is the provision of data output selector 12 for selecting the output of the D/A 11 and zero level depending on the output of the first identifier distinguishing means 7, and that the first identifier distinguishing means 7 issues the judging result to the data processing selector 9 and data output selector 12.

In embodiment 2, the data processing selector mentioned in the claim corresponds to the combination of the data processing selector 9 and data output selector 12.

In the audio transmitting apparatus and audio receiving apparatus in embodiment 2 having such configuration, the operation is described below.

The operation at the DVD player 1 side is same as in embodiment 1, and its explanation is omitted The operation at the amplifier 2 side is as follows: when the audio data issued from the IEEE1394 bus 13 is changed from the linear PCM data to nearly zero data with silent identifier, the first identifier distinguishing means 7 detects the silent identifier from the label and issues the result to the data processing selector 9 and data output selector 12. The data output selector 12 selects mute as the data output. If not silent identifier C at this time, selecting the output of the D/A 11, it is demuted. The operation of the data output processing selector 9 is same as in embodiment 1.

This is because the nearly zero data is not completely silent, and it is the means of making silent securely to mute the audio output of the final stage at the time of detection of the silent identifier.

FIG. 8 is a diagram showing the timing when the digital audio data changes from linear PCM data to nonlinear PCM data in embodiment 2. As shown in FIG. 8, since the silent identifier is detected early, delay occurs hardly, but the audio data with silent identifier is nearly zero data, and therefore noise of large volume is not generated if the identifier is linear PCM. Further, at the moment of detecting the silent identifier, since the data output selector 12 receives the output of the first identifier distinguishing means 7, and selects mute as data output, and therefore the output is securely silent except for the detection delay time of the silent identifier.

Thus, according to the embodiment, while detecting the silent identifier, the reception side mutes the audio data output, and noise is prevented securely regardless of the type of the nonlinear PCM data, so that it is possible to cope quickly with the type change of the transmitted digital audio data.

In the foregoing embodiments 1 and 2, the audio data is changed from linear PCM data to nonlinear PCM data, but it may be also designed to change from nonlinear PCM data to linear PCM data. In this case, the data processing selector 9 changes over from the data decoder 10 side directly to the D/A side, so that mute occurring in the data decoder does not take place.

In the embodiments 1 and 2, the data processing selector is placed before the data decoder 10, but it may be also placed between the data decoder 10 and D/A 11.

Also in the embodiments 1 and 2, the DVD player is stopped when transmitting silent identifier and nearly zero data, but silent identifier and nearly zero data may be also transmitted without stopping.

Also in the embodiments 1 and 2, the silent identifier is assigned with the label but other place, for example, an unused region of CIP header may be also assigned.

Also in the embodiments 1 and 2, the transmitting apparatus is an DVD player, but it may be other apparatus.

In embodiment 2, the data output selector 12 is placed after the D/A 11, but it may be also placed before the D/A 11.

Also in embodiment 2, dividing into the data processing selector 9 and data output selector 12, they may be combined, and one may be selected from three outputs, that is, the straight output, decoder output, and mute output The mute is preferably effected by soft mute such as fade-out and fade-in because shock noise can be prevented. That is, in FIG. 8, when changing from the linear PCM at the reception side output to the zero data, it is designed to fade out from the transmitted nearly zero data to the "zero data" set by the data output selector 12. Or in the beginning portion of "mute", it is designed to fade in from "zero data" to "mute (substantially zero data)." For this purpose, the data output selector 12 is required to have a circuit configuration capable of making soft mute, aside from mere changeover switch. However, it is also possible to design to fade in when decoding is started by the data decoder 10, and at this time it is designed to act to fade in the beginning portion of the nonlinear PCM of the reception side output in FIG. 7 and FIG. 8.

Thus, according to the foregoing embodiments, at the transmission side, since the silent identifier and nearly zero data are inserted for a specific time when the type of the audio data is changed over, the silent identifier is detected at the reception side and muted appropriately, and the decoding process can be initialized securely, so that the conventional problem of noise occurrence can be prevented perfectly.

(Embodiment 3)

In the configuration of the foregoing embodiments 1 and 2, in the DVD or the like, when the audio stream to be transmitted is changed from the IEC60958 format to the multi-channel and high-sampling format of DVD, for example, if the type of the stream is changed, problems of losing the end portion of previous stream or losing the beginning portion of next stream may occur.

Figure 18:
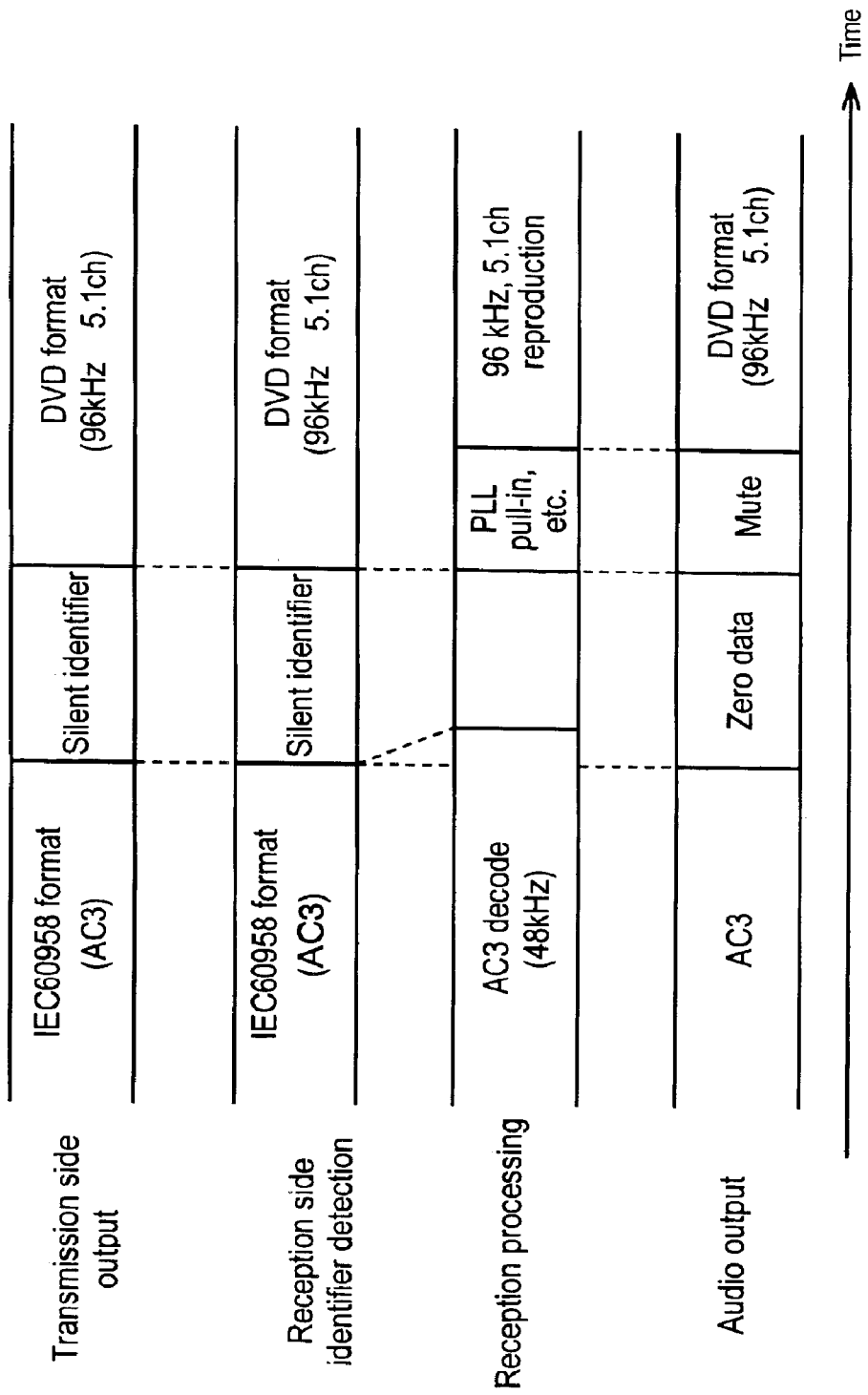
FIG. 18 is a timing chart when the digital audio data changes from the AC3 encode data of IEC60958 format to DVD format in embodiments 1 and 2.

FIG. 18 is a ting chart when the digital audio data is changed from the AC3 encode data of IEC60958 format to the DVD format. In the example in FIG. 18, suppose that the AC3 encode data of IEC60958 format is transmitted and is transformed into data of DVD format enclosing the packet of the silent identifier. In this case, at the reception side, the identifier is detected nearly at the same timing as at the transmission side. The AC3 encode data is decoded at the reception side. The AC3 encode data is compressed in one unit of 1536 frames, and therefore a delay of 1536 frames occurs from the reception of encode data until output of audio data after finishing decoding process. Since the AC3 of the DVD is 48 kHz sampling, this delay is about 32 ms. However, in the constitution in embodiments 1 and 2, when the identifier showing the AC3 is terminated to be silent identifier, although the output of the AC3 decoding is not finished yet, zero data is issued, and losing of end portion of AC3 output occurs in the audio output. Next to the silent identifier, when the data of DVD format is sent and its sampling frequency is 98 kHz, the PLL generating the processing clock is once cut off, and pulled in again It may take about 100 ms until a stable dock necessary for regeneration is obtained. In this period, the DVD audio data cannot be reproduced, and is in mute state, and the beginning portion of the content is lost.

This embodiment is intended to solve the problems not solved by the foregoing embodiments 1 and 2, and it is an object thereof to present an audio transmitting apparatus and an audio receiving apparatus not losing the end portion of previous stream or the beginning portion of next stream at the receiving apparatus side if the format is changed.

In embodiment 3 of the invention, the audio transmitting apparatus and audio receiving apparatus are connected with IEEE1394 bus. The following explanation relates to an example of connection of stream in the case of converting the data to be transmitted by the AM protocol from the AC3 encode data of IEC60958 format into DVD 5.1ch audio data.

Figure 9:
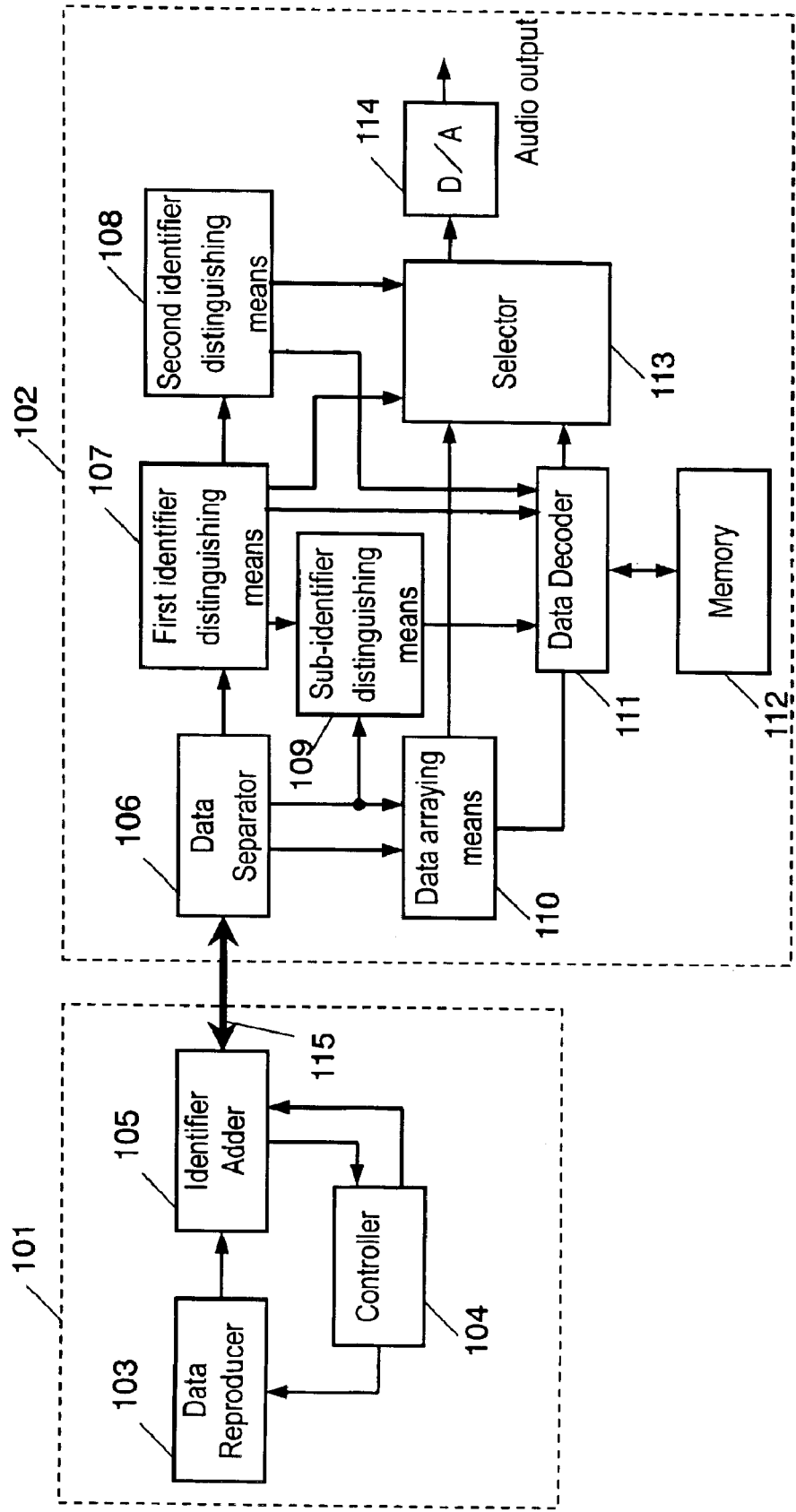
FIG. 9 is a block diagram showing a configuration of audio transmitting apparatus and audio receiving apparatus in embodiment 3 of the invention.

FIG. 9 is a block diagram showing a configuration of audio transmitting apparatus and audio receiving apparatus in embodiment 3 of the invention.

In FIG. 9, as an example of audio transmitting apparatus, a DVD player 101 reproduces a DVD (digital versatile disc), and issues at least digital audio output to an IEEE1394 bus as transmission route. As an example of audio receiving apparatus, an amplifier 102 reproduces the digital audio data issued to the IEEE1394 bus.

In the DVD player 101, data reproducer 103 reproduces digital audio data and management information of digital audio data from the DVD. Controller 104 controls the output of the data reproducer 103. Identifier adder 105 distinguishes the kind of digital audio data from the management information of digital audio data, and issues the result to the controller 104 as the identifier (or identification information). At the same time, the adder 105 transforms the identifier into a label format, and adds a label to the digital audio data and issues to an IEEE1394 bus 115. The components from data reproducer 103 to the identifier adder 105 compose the DVD player 101.

In the amplifier 102, data separator 106 separates the data entered from the IEEE1394 bus 115 into label and digital audio data. First identifier distinguishing means 107 distinguishes the content of the label of each quadlet of AM protocol packet. Second identifier distinguishing means 108 accumulates channel status bits for 192 frames when the label shows the IEC60958 format, and distinguishes whether the audio data is linear PCM or not. Sub-identifier distinguishing means 109 distinguishes the content of the sub-identifier following the silent identifier when the judging result of the first identifier distinguishing means 107 is silent identifier. Data arraying means 110 arrays the data depending on the judging result of the first identifier distinguishing means 107 or the like. Data decoder 111 loads a decoding method from memory 112 depending on the information from the first identifier distinguishing means 107, second identifier distinguishing means 108, and sub-identifier distinguishing means 109. The decoder 107 decodes the data from the data arraying means 110 depending on the method. The memory 112 stores the decoding method of the data decoder 111. Selector 113 selects the data from the data arraying means 110 or data decoder 111, depending on the information from the first identifier distinguishing means 107, second identifier distinguishing means 108, and sub-identifier distinguishing means 109. A DA converter (D/A) 114 converts digital audio data into an analog signal.

In this embodiment, the first identifier distinguishing means 107, second identifier distinguishing means 108, and sub-identifier distinguishing means 109 are collectively called the identifier distinguishing means.

In thus constituted audio transmitting apparatus and audio receiving apparatus of the embodiment, the audio transmitting operation is described below.

First, the DVD player side operation is explained.

Figure 5:
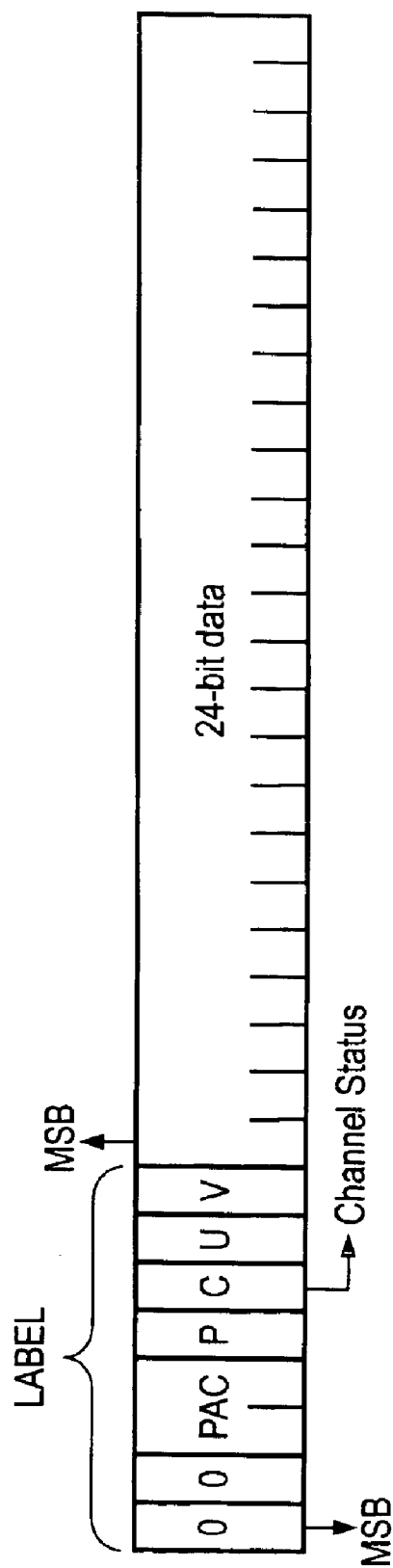
FIG. 5 is a diagram showing AM824 data composition in the case of IEC60958 format data.
Figure 6:
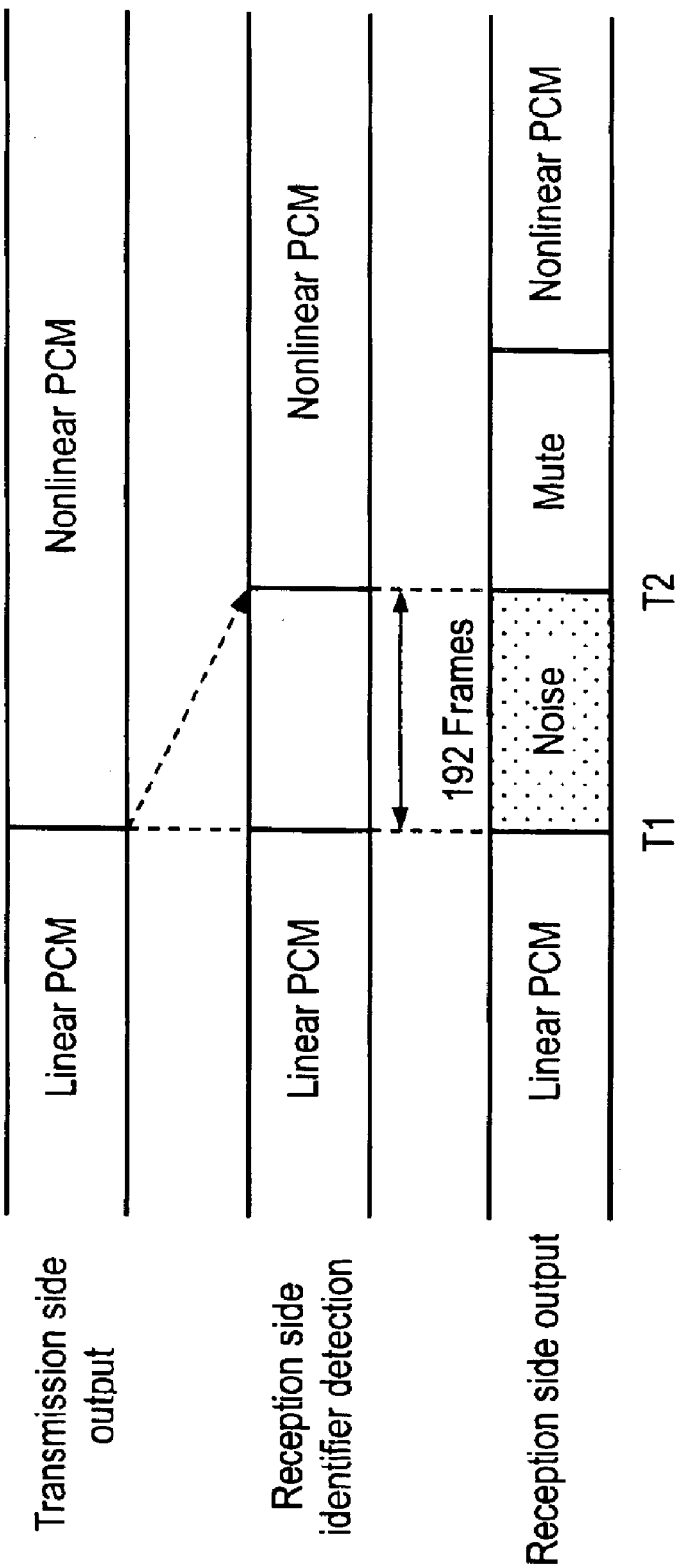
FIG. 6 is a diagram showing the timing when the digital audio data changes from linear PCM data to nonlinear PCM data in a prior art.
Figure 16:
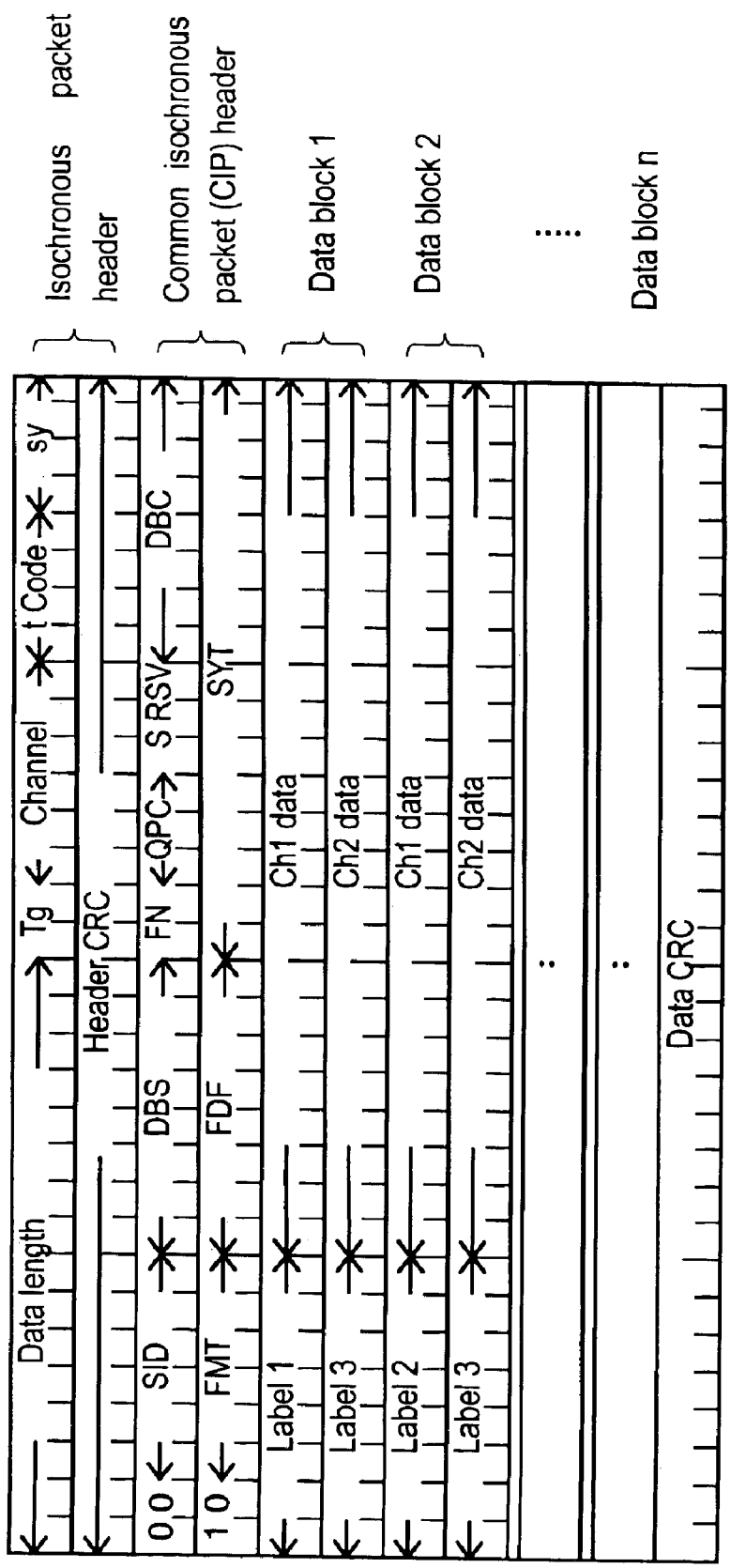
FIG. 16 is a diagram showing an example of isochronous packet of AM protocol.
Figure 17:
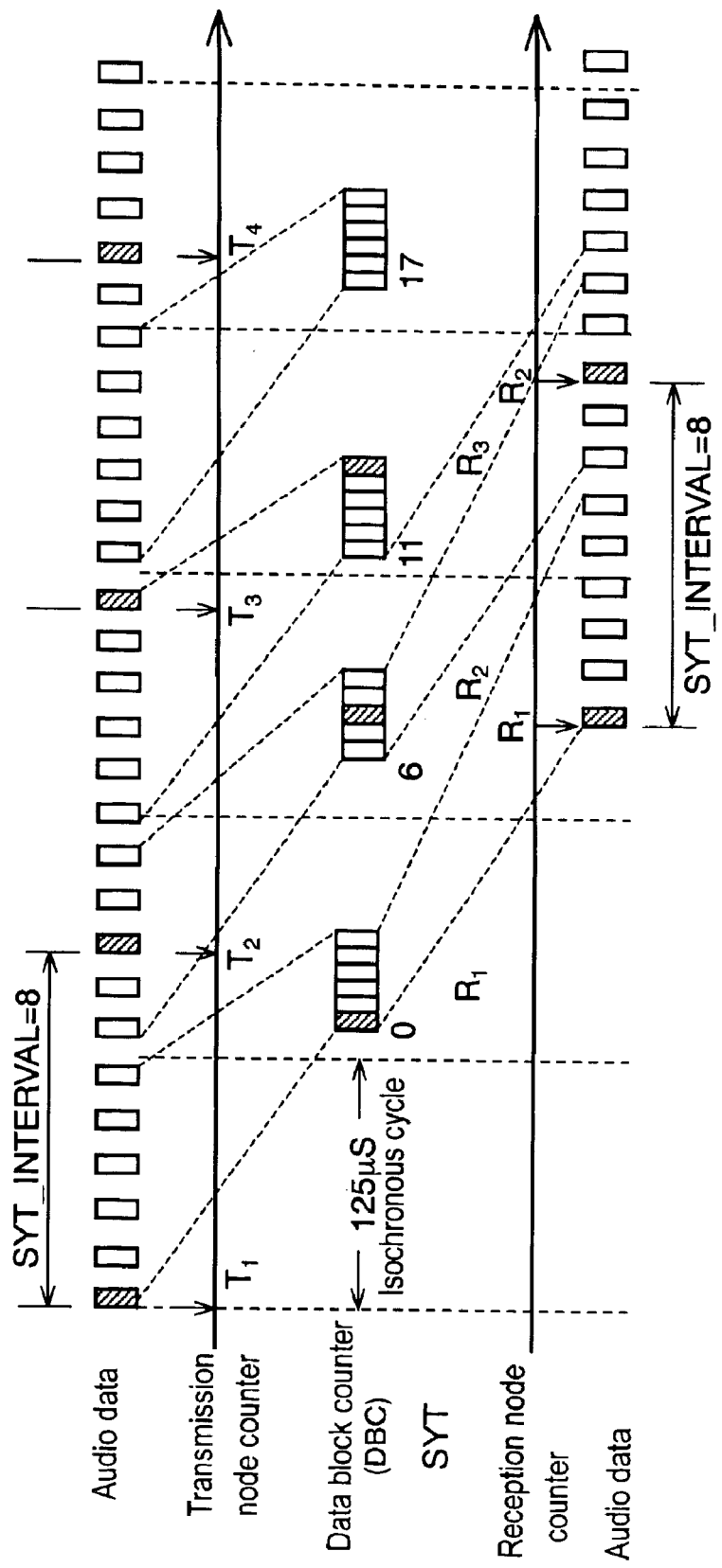
FIG. 17 is a diagram showing audio data transmission and reception timing in non-blocking system.

The data reproducer 103 is supposed to reproduce the DVD in the first place, and issues the AC3 encode data to the identifier adder 105. The identifier adder 105 generates identifier A from the management information of audio data issued from the data reproducer 103, and issues the identifier A to the controller 104. At the same time, the adder 105 converts the identifier A into the label format, and adds the label to the audio data, and issues to the IEEE1394 bus 115. The AC3 encode data is stored in the AM protocol packet of IEC60958 format. This packet is the same as the one shown in FIG. 16. The label has a value from 00h to 3fh At the position of bit number 1 of the bit row summing up the channel status C in FIG. 5 into one data block (192 frames), there is a flag showing whether this stream is linear PCM or not. This flag has a value of 1 if it is not linear PCM. The method of transmitting compressed audio data in IEC60958 format is standardized as IEC61937. In the IEC61937, the data portion is called data burst In the beginning header of the data burst, the data type of this portion (showing the type of compressed format or the like) is stored. In the packet of the AM protocol issued onto the 1394 bus, the AC3 encode data is stored as the data burst in the portion of sub-frame data 24 bits.

Suppose the audio data of the DVD being reproduced by the data reproducer 103 is changed from the AC3 encode data into DVD 5.1ch audio data. At this time, the controller 104 detects the change from the identifier issued from the identifier adder 105, and audio output of the data reproducer 103 is stopped. As the stopping means, several methods may be considered, and it is supposed that the DVD reproduction operation is stopped in this case.

Figure 10:
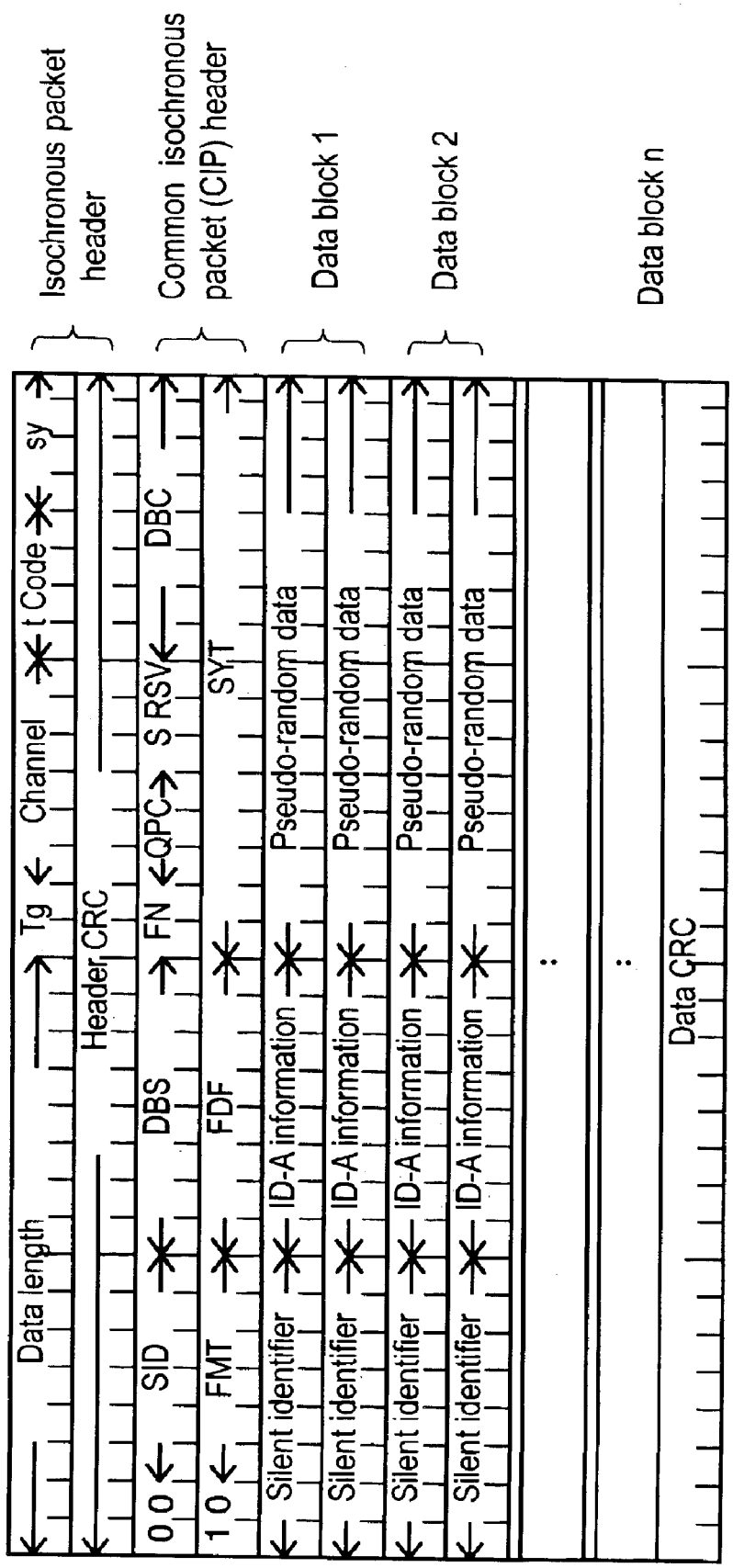
FIG. 10 is a diagram showing an example of a packet adding a silent identifier and identifier A before change.

The identifier adder 105 issues the packet combining the silent identifier and identifier A before change. An example of such packet is shown in FIG. 10.

As the silent identifier, for example, label CFh showing there is no data proposed in the AM protocol expansion proposal is used. The eight bits following the label store the identifier A information. Herein, the information showing the IEC60958 is stored, but 00h may be used as a representative value of IEC60958. If the label value 00h to 3Fh of the AC3 encode data including the channel status C can be generated precisely as the time series, the value may be entered in such device. In 16 bits after the identifier A information, any information may be used. For example, it is possible to enter "0" in all. However, of these 16 bits, sequentially different data such as pseudo-random numbers may be entered in specific bits, for example, LSB 8 bits. Pseudo-random numbers may be generated by using, for example, M series generator. By putting such pseudo-random numbers, when this packet is ciphered, the ciphered packet is prevented from being a same value, and it is more difficult to analyze the ciphering algorithm.

The identifier adder 105 issues a packet combining the silent identifier and identifier B after change in a specified time T1 after start of output of packet combining the silent identifier and identifier A before change, for example, 40 ms later. The time T1 to transfer to the packet having the identifier B information is not particularly specified as far as larger than a specified value (for example, 3 ms). For example, in the AC3, processing delay in the decoder occurs by about 32 ms, and T1 is preferred to be set longer. The value of T1 may be varied to a proper value depending on the processing delay of the application (compression format). It is also possible to share the device control software between the audio appliance and video appliance.

In the DVC(Digital Video Cassette) in which the IEEE1394 is widely employed, one frame is 33 ms, and it is designed to record and reproduce in 10 tracks per frame on the tape, so that the processing unit is 3.3 ms. In the DVC, the AM protocol is not used, but it is possible to handle the AM protocol in the control software common with the DVC. Hence, considering a system of incorporating the identifier information of AM protocol in the microcomputer and using in some processing (for example, status display of device), T1 must be 3 ms or more.

In actual mounting, it is impossible to change to the output of the packet combining the identifier B until it is known what is the identifier B of the next stream, and the packet of identifier A information is issued continuously until it is known.

Figure 11:
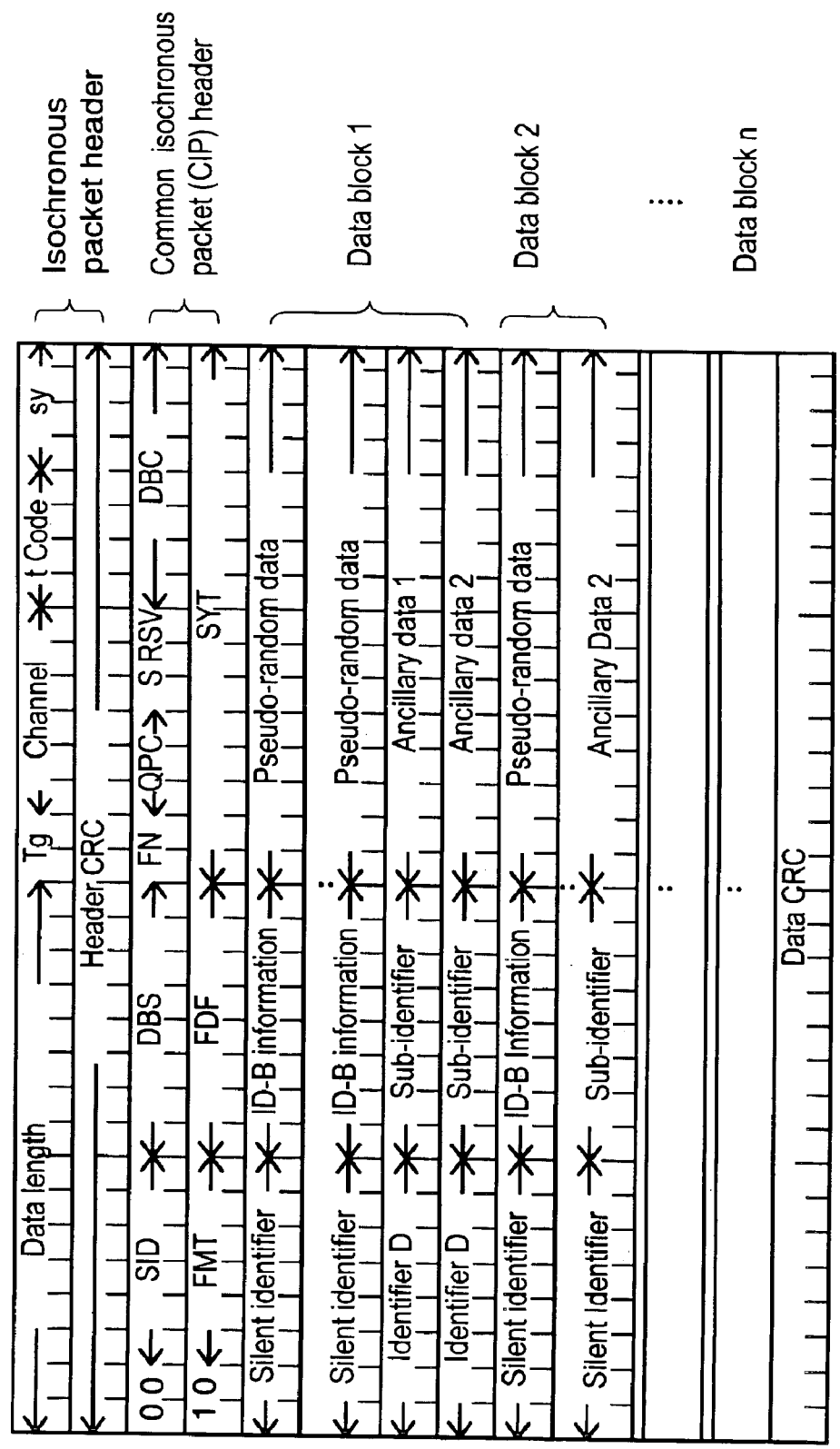
FIG. 11 is a diagram showing an example of a packet adding a silent identifier and identifier B after change.

An example of the packet combining the silent identifier and identifier B after change is shown in FIG. 11. DVD 5.1ch data is composed of 6 quadlets of multi-bit linear audio data and 2 quadlets of ancillary data. Therefore, the DBS (data block size) of CIP header is 8. The sampling frequency includes 96 kHz and 192 kHz aside from 48 kHz, and the value corresponding to the management information of data reproduced by the data reproducer 103 is set in the FDF. The time stamp stored in the SYT field is the time stamp produced by the clock corresponding to the data of the identifier B reproduced by the data reproducer 103.

The silent identifier is CFh same as in the case of identifier A information. As the identifier B information, any value from D8h to DBh is used out of the multi-bit linear audio proposed in the AM protocol extension plan. D8h is 24 bits in data length, D9h is 20 bits, DAh is 16 bits, and DBh is the same data length as the previous one. After the identifier B information, same as in the case of FIG. 10, all-zero data, sequentially changing data, pseudo-random number and others are stored.

The silent identifier of 6 quadlets is followed by 2 quadlets of identifier D for storing ancillary data. The value of identifier D is D0h as proposed in the AM protocol extension plan. The identifier D is followed by the field of sub-identifier. The sub-identifier shows the format of the data stored in 16 bits after the sub-identifier field. It shows the sampling frequency of each channel (in DVD, the sampling frequency of 5.1ch is not always the same), channel allocation, dynamic range control down-mix coefficient, emphasis flag, copy control information, ISRC (international standard recording code), etc. Some of the information may not be understood without reading the specified content of the DVD disk, but others are common in the entire disk, and all information understood depending on the situation can be transmitted.

After a specified time T2, for example, 300 msec, the identifier adder 105 begins to issue the packet of DVD 5.1ch. The time T2 until transfer to the DVD 5.1ch packet is not particularly specified unless it is more than a specific time (for example, 3 ms). However, when the sampling frequency is changed from the previous value in the DVD 5.1ch, the PLL is once unlocked, and is pulled in again. For reproduction at high quality, it takes about 100 ms until the PLL is sufficiently stable. Besides, depending on the application of the audio transmitting apparatus, the compression format may be varied. Due to format change, the processing method at the receiving side is changed, and it may take a longer time for preparation. Therefore, the duration of time T2 may be changed depending on the next stream or preceding stream.

Thus, in the block for output of data such as DVD player, when the audio data changes from identifier A (for example, AC3 encode data) to identifier B (for example, DVD 5.1ch audio data), it is designed to issue to the IEEE1394 bus by interposing between the packet combining the silent identifier and identifier A before change for more than a specified time T1, and the packet combining the silent identifier and identifier B after change for more than a specified time T2.

The operation at the amplifier side for receiving data from the IEEE1394 bus is explained.

The amplifier first separates into the label and audio data by the data separator 106, and the label is sent into the first identifier distinguishing means 107 and the audio data into the data arraying means 110. The DBS of the CIP header is sent to the data arraying means 110.

The first identifier distinguishing means 107 distinguishes the content of the label and sends the result to the selector 113. At the same time, the distinguishing means 107, when the label is of IEC60958 format, sends the label content to the second identifier distinguishing means 108. When the label content is the silent identifier C, it is also noticed to the sub-identifier distinguishing means 109.

The second identifier distinguishing means 108 extracts the channel status bit from the label, and accumulates for 192 frames to make channel status data, and judges if the audio data is linear PCM data or not. The result of judgement is sent to the data decoder 111 and selector 113.

The sub-identifier distinguishing means 109 distinguishes the identifier information following the identifier when the first identifier distinguishing means judges silent identifier C.

Figure 12:
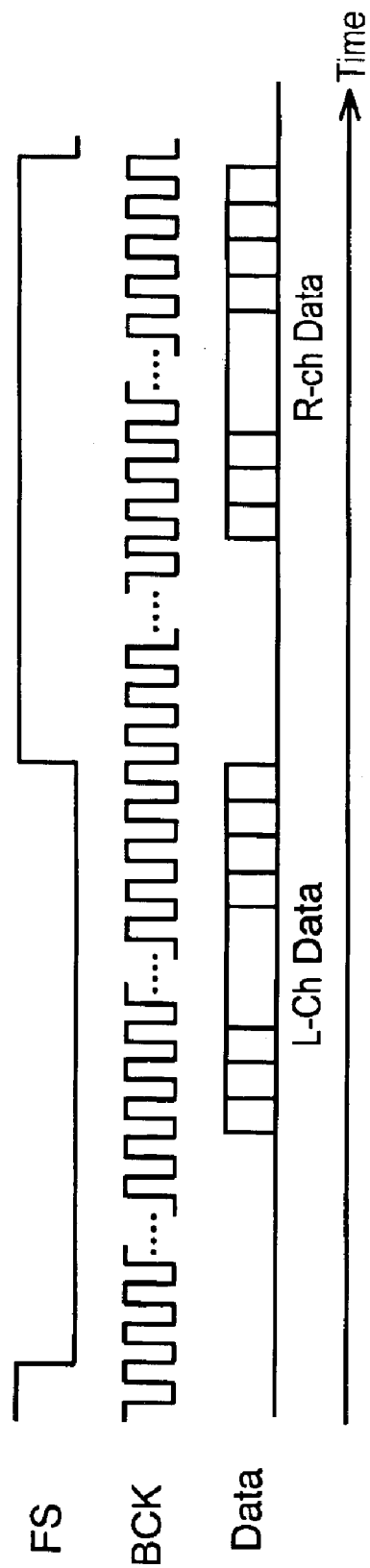
FIG. 12 is a diagram showing a waveform example of three-wire type audio data transmission.

The data arraying means 110 arrays the data separated by the data separator into a specified format and issues on the basis of the identifier, DBS and ancillary data. For example, in the case of the IEC60958 format, the data block of each CIP is arrayed into two channels, L channel and R channel, and is issued in a specified format. Inside the audio appliance, the audio data is often transmitted between the LSIs in a format called three-wire-system. A waveform example of audio data transmission by three-wire system is shown in FIG. 12. In this format, the clock signal of sampling frequency FS, BCK signal for data transfer (n times of FS, n=32, 48, 64, . . . are often used), and two-channel data are alternately transmitted in three wires by serial transmission.

In the case of DVD 5.1ch, fm the beginning of each block, 6 quadlets are arrayed as six-channel audio data, and transmitted between LSIs in a format of adding two more data wires to the three-wire system. In this case, data of six channels are often divided into three pairs, that is, (L, R), (C (center), LFE (low tone)), (SL (surround L), SR (surround R)). Three data wires are connected to the selector 113, and when the linear PCM (2 ch) of the IEC60958 format is received, the data wires of (C, LFE) and (SL, SR) are set at zero data (fixed at L level). As a result, the final analog audio data output is silent. Depending on the mounting, analog mute may be provided after the DA, and the silent channel may be set zero in analog terms. The silent identifier C may contain sequentially changing data or pseudo-random number, and it may be also replaced by zero data and muted.

The data decoder 111 decodes the data by the decoding method corresponding to the judging result by the first identifier distinguishing means 107 and the compression format contained in the data entered from the data arraying means 110. If the judging result of the first identifier distinguishing means 107 is silent identifier C, the judging result of the sub-identifier distinguishing means 109 is used instead of the result of the first identifier distinguishing means 107. In the case of the DVD player, the data requiring decoding is the nonlinear PCM data of IEC60958. In this case, the header of data burst is detected from the data entered from the data arraying means 110, and the data is decoded according to the data type stored therein. In the memory 112, the decoding method for the data decoder 111 is stored. The memory 112 supplies the decoding method to the data decoder 111 depending on the request from the data decoder 111. The decoding method stored herein is the decoding program, for example, AC3, dts, and MPEG.

The selector 113 selects the output of the data arraying means 110 or data decoder 111 depending on the judging result of the first identifier distinguishing means 107 and second identifier distinguishing means 108. When the input data is of IEC60958 format and nonlinear PCM, the output from the data decoder 111 is selected, and in the case of IEC60958 format and linear PCM, or multi-bit linear audio, the output of the data arraying means 110 is selected. In the case of silent identifier, the judging result of the sub-identifier distinguishing means 109 is used instead of the judging result of the first identifier distinguishing means 107. In the case of IEC60958 format, when the label is 00h only, it is not distinguished whether linear PCM or nonlinear PCM in spite of IEC60958 format, and the previous state is maintained.

The output of the selector 113 is put into the D/A 114, and is converted into analog audio data.

Figure 13:
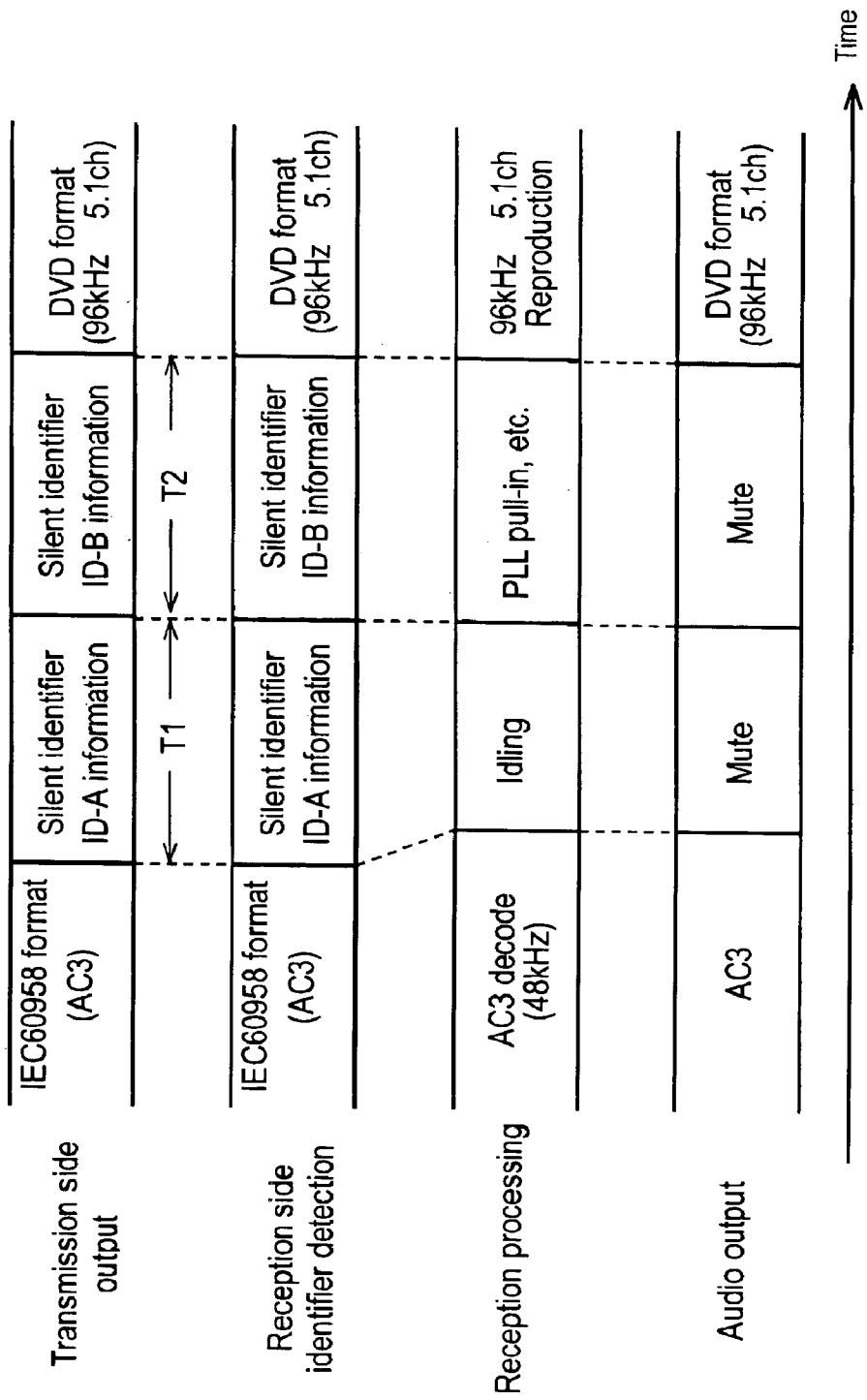
FIG. 13 is a diagram showing timing of data transmission and reception and processing in the audio transmitting apparatus and audio receiving apparatus in embodiment 3 of the invention.
Figure 14:
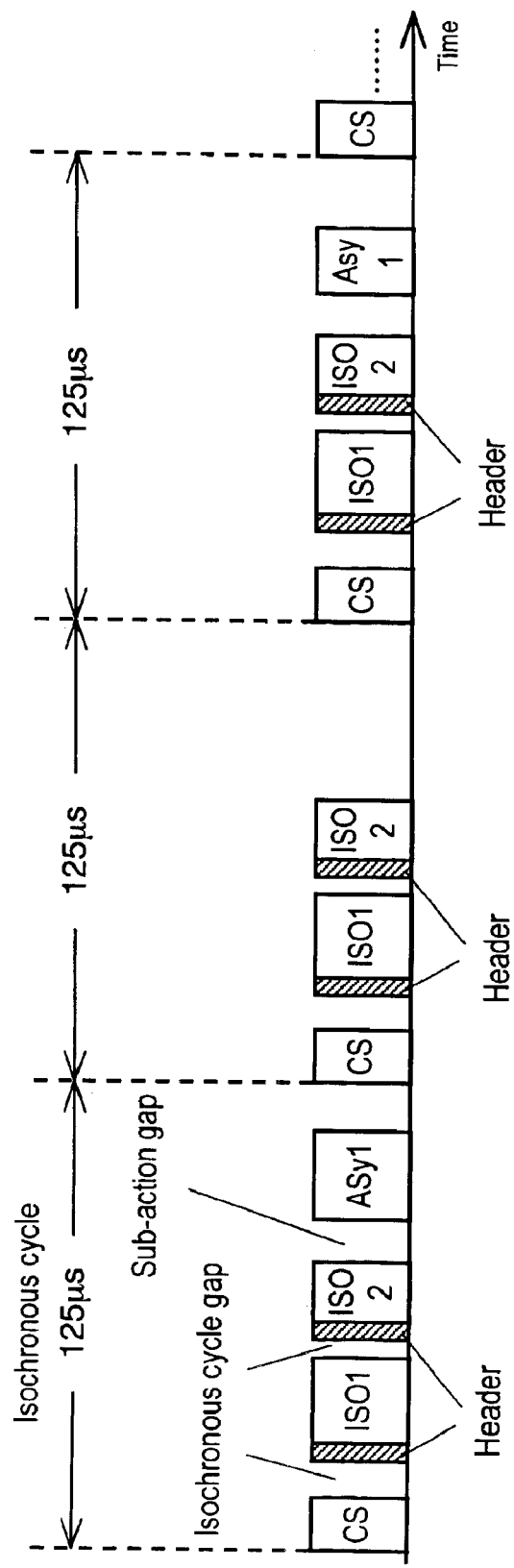
FIG. 14 is a diagram showing packet transmission timing on the IEEE1394 bus.

The timing of data transmission, reception and processing explained above is shown in FIG. 13. In FIG. 13, first the AC3 encode data of IEC60958 format is transmitted, and then it is changed to the data of DVD 5.1ch format before and after two kinds of packets of silent identifier.

The AC3 encode data is decoded at the reception side, and AC3 is obtained as audio output.

When the transmission side output is changed from the AC3 encode data to the packet of silent identifier, the reception side detects the silent identifier. The sub-identifier distinguishing means 109 detects label 00h of IEC60958 format as identifier A information Consequently, the selector 113 continues to select the output of the data decoder 111, and AC3 is obtained as audio output. When all AC3 encode data collected in the data decoder 111 is decoded, the data decoder 111 is set in idling state because there is no encode data, so that the output is muted.

Together with the silent identifier, when the identifier B information showing DVD 5.1ch is sent, in the sub-identifier distinguishing means 109, multi-bit audio data (for example, D8h) is detected as label and it is known that setting of DVD 5.1ch is needed in spite of silent state. At this time, the sampling frequency information of the FDF field of the CIP header of the packet is changed to 96 kHz. At the same time, the time stamp of the SYT field is also replaced by a value corresponding to 96 kHz, and the PLL (not shown, but a PLL for clock reproduction as shown in FIG. 15) of the amplifier 102 is unlocked from 48 kHz, and starts to pull in according to the new time stamp of 96 kHz. The data stored in the ancillary data of each data block is also read out, and necessary setting is done at the amplifier side. In this period, the audio output is kept in muted state.

Later, when the identifier is changed from the silent identifier to the DVD 5.1ch and 5.1ch audio data is sent in, the amplifier 102 is already prepared for 5.1ch reproduction, and audio output of 5.1ch is started immediately without losing the beginning portion of next stream.

Thus, according to the embodiment, at the reception side, once the silent identifier is detected, the preceding data format or succeeding data format is known from the sub-identifier. It is thus possible to prevent loss of end portion of transmitted digital audio data or loss of beginning portion of next steam by quickly reacting to the type change.

As explained in embodiment 3, the audio data is changed from AC3 encode data of IEC60958 format to DVD 5.1ch data, but it may be also changed to other data format (linear PCM of IEC60958 format, SACD (super-audio CD), etc.).

In embodiment 3, the DVD player is stopped when transmitting silent identifier, but the silent identifier and nearly zero data may be transmitted without stopping.

In embodiment 3, the silent identifier is assigned with the label but it may be also assigned with other place, for example, unused region of CIP header.

In embodiment 3, the transmitting apparatus is the DVD player, but other appliance may be also used.

Preferably, muting should be soft muting of fade-out and fade-in, so that the shock sound can be prevented.

The identifiers A, B, C and D explained in the foregoing embodiments do not correspond to any specific identifiers. Supposing an identifier of a certain data format to be A, when changed from this data format to a different data format, the identifier corresponding to this is supposed to be identifier B.

The invention may be also changed and modified without departing from the true spirit thereof.

Thus, according to the embodiments, at the transmission side, when the type of the audio data is changed, a packet including silent identifier and identifier information before change, and a packet including silent identifier and identifier information after change are inserted for a specific time. At the reception side, the silent identifier is detected, and the audio data before change is issued appropriately, and losing of end portion of previous stream is prevented, and by preparing for processing of data format after change, losing of beginning portion of next steam is also prevented.

What is claimed is:

1. An audio transmitting apparatus comprising:
   data reproducer for outputting digital audio data and control information for the digital audio data;
   identifier adder for identifying a coding type of the digital audio data, and for adding identification information showing the identified coding type on the digital audio data, and for sending out the identification information added on the digital audio data; and
   controller for controlling an output of the digital audio data issued from the data reproducer,
   wherein when the identification information changes from identification information A showing a first coding type to identification information B showing a second coding type,
   (a) the controller stops the output of the digital audio data issued from the data reproducer for a specified time,
   (b) the identifier adder
      (i) generates silent identification information C indicating substantially zero data during the specified time, and
      (ii) performs at least one of adding the identification information A on the silent identification information C in a first half of the specified time and adding the identification information B on the silent identification information C in a second half of the specified time,
   and outputs the silent identification information C.

2. The audio transmitting apparatus of claim 1, wherein said identification information A shows linear PCM mode, and said identification information B shows nonlinear PCM mode.

3. The audio transmitting apparatus of claim 1, wherein the specified time of transition of said identification information from said identification information A to said identification Information B ranges from 3 msec to hundreds of msec.

4. The audio transmitting apparatus of claim 1, wherein the digital audio data of a coding type shown by said identification information A fades out immediately before transition.

5. The audio transmitting apparatus of claim 1, wherein the digital audio data of a coding type shown by said identification information B fades in for a specified time after transition.

6. The audio transmitting apparatus of any one of claims 1 to 5, wherein the transmission route for sending out data issued from the identifier adder is IEEE1394.

7. The audio transmitting apparatus of any one of claims 1 to 5, wherein the transmission route for sending out data issued from the identifier adder is IEEE1394, and said silent identification information C is ancillary data specified in Audio and Music Data Transmission Protocol of the IEEE1394.

8. The audio transmitting apparatus of any one of claims 1 to 5, wherein the transmission route for sending out data is IEEE1394, and said silent identification information C has a specified data region, and said data region is "0" in a specified bit row at the MSB side.

9. The audio transmitting apparatus of claim 1, wherein one of said identification information A or identification information B shows non-encode mode, and others show encode mode.

10. The audio transmitting apparatus of claim 1, wherein said T1 is 3 msec or more.

11. The audio transmitting apparatus of claim 1, wherein said T2 is 3 msec or more.

12. The audio receiving apparatus according to claim 1, wherein the identification information A and the identification information B further including information showing at least one of a number of channels, a data length, a sampling frequency, channel allocation information, dynamic range control information, a down-mix coefficient, an emphasis flag, copy control information and an internal standard recording code (ISRC) of the digital audio data.

13. The audio transmitting apparatus of claim 1, wherein said silent identification information C includes a specified data region and includes the identification information A and the identification information B at an MSB side of the data specified region.

14. The audio transmitting apparatus of claim 13, wherein sequentially different data are stored in at an LSB side in the specified data region.

15. The audio transmitting apparatus of claim 13, wherein pseudo-random number data are stored in at an LSB side in the specified data region following said silent identification information C.

16. An audio receiving apparatus comprising identification information distinguishing means for distinguishing the identification information showing the type of the data received through a transmission route,
   wherein digital audio data is issued directly in the case of identification information showing non-encode mode, depending on the output of said identification information distinguishing means, or issued by way of data decoding means in the case of identification information showing encode mode, and
   when said identification information distinguishing means distinguishes silent identification information C, the output is immediately muted nearly to zero in the case of identification information showing the identification information before the silent identification information C is non-encode mode, or the output is muted nearly to zero after termination of processing of the data in process by said data decoding means in the case of identification information showing the identification information before the silent identification information C is encode mode.

17. An audio receiving apparatus comprising identification information distinguishing means for distinguishing the identification information showing the type of the data received through a transmission route, wherein digital audio data is issued directly in the case of identification information showing non-encode mode, depending on the output of said identification information distinguishing means, or issued by way of data decoding means in the case of identification information showing encode mode, and when said identifier distinguishing means distinguishes silent identification information C, the output is immediately muted nearly to zero in the case of identification information showing the identification information before the silent identification information C is non-encode mode, or the output is muted nearly to zero after termination of processing of the data in process by said data decoding means in the case of identification information showing the identification information before the silent identification information C is encode mode, thereby changing to the setting for data output depending on the identification information accompanying said silent identification information C in the midst of muting by said silent identification information C.

18. The audio receiving apparatus of claim 16 or 17, wherein the transmission route for receiving data is IEEE1394.

19. The audio receiving apparatus of claim 16 or 17, wherein the transmission route for receiving data is IEEE1394, and said silent identification information C is ancillary data specified in Audio and Music Data Transmission Protocol of the IEEE1394.

20. An audio transmitting apparatus comprising:

data reproducer for outputting digital audio data and control information for the digital audio data;

identifier adder for identifying at least one of a coding type, a number of channels, and a sampling frequency of the digital audio data, and means for adding identification information showing at least one of the coding type, the number of channels, and the sampling frequency on the digital audio data, and for sending out the identification information added on the digital audio data; and controller for controlling an output of the digital audio data issued from the data reproducing means, wherein when said at least one of the coding type, the number of channels, and the sampling frequency shown by identification information A changes to said at least one of the coding type, the number of channels shown by identification information B which is different information than the information shown by the identification information A, (a) the controller stops the output of the digital audio data issued from the data reproducer for a specified time, (b) the identifier adder,
(i) generates silent identification information C indicating substantially zero data during the specified time, and
(ii) performs at least one of adding the identification information A on the silent identification information C in a first half of the specified time and adding the identification information B on the silent identification information C in a second half of the specified time, and outputs the silent identification information C.

* * * * *